United States Patent
Kim et al.

(10) Patent No.: US 12,098,242 B2
(45) Date of Patent: Sep. 24, 2024

(54) BIODEGRADABLE POLYESTER RESIN COMPOSITION, BIODEGRADABLE POLYESTER FILM INCLUDING THE SAME AND BIODEGRADABLE MOLDED ARTICLE INCLUDING BIODEGRADABLE POLYESTER RESIN COMPOSITION

(71) Applicant: Ecovance Co. Ltd., Gyeonggi-do (KR)

(72) Inventors: Seong Dong Kim, Gyeonggi-do (KR); Kyung Youn Kim, Gyeonggi-do (KR); Hoon Kim, Gyeonggi-do (KR); Jun Su Byeon, Gyeonggi-do (KR); Eun Sun Joeng, Gyeonggi-do (KR)

(73) Assignee: ECOVANCE CO. LTD., Gyeonggi-Do (KR)

( * ) Notice: Subject to any disclaimer, the term of this patent is extended or adjusted under 35 U.S.C. 154(b) by 0 days.

(21) Appl. No.: 18/320,742

(22) Filed: May 19, 2023

(65) Prior Publication Data
US 2023/0374203 A1 Nov. 23, 2023

(30) Foreign Application Priority Data

May 21, 2022 (KR) .......... 10-2022-0062451
May 21, 2022 (KR) .......... 10-2022-0062452

(51) Int. Cl.
C08G 63/183 (2006.01)
(52) U.S. Cl.
CPC .................. C08G 63/183 (2013.01)
(58) Field of Classification Search
CPC . C08G 63/183; C08J 2367/02; C08J 2467/02; C08J 5/18; C08L 67/02
See application file for complete search history.

(56) References Cited

U.S. PATENT DOCUMENTS

| | | | | |
|---|---|---|---|---|
| 5,256,760 A * | 10/1993 | Jaffe | ............ | C08G 63/065 528/184 |
| 6,046,248 A * | 4/2000 | Warzelhan | ........ | C08G 63/916 525/445 |
| 9,637,589 B2 | 5/2017 | Kang et al. | | |
| 2005/0209374 A1* | 9/2005 | Matosky | ........ | A61F 13/51 524/47 |
| 2011/0034662 A1* | 2/2011 | Witt | ............ | C08G 63/785 528/279 |
| 2011/0039999 A1* | 2/2011 | Witt | ............ | C08G 18/73 524/879 |
| 2014/0128514 A1* | 5/2014 | Witt | ............ | C08G 18/4241 524/35 |
| 2019/0270882 A1* | 9/2019 | Zheng | ............ | A61L 15/14 |
| 2021/0380757 A1* | 12/2021 | Kim | ............ | C08J 5/18 |

FOREIGN PATENT DOCUMENTS

| | | |
|---|---|---|
| JP | 2007532699 A | 11/2007 |
| JP | 2020502288 A | 1/2020 |
| KR | 2003-0028444 A | 4/2003 |
| KR | 10-2014-0031010 A | 3/2014 |
| KR | 20210111186 A | 9/2021 |
| KR | 10-2021-0147332 A | 12/2021 |
| KR | 10-2021-0147334 A | 12/2021 |
| KR | 10-2022-0015623 A | 2/2022 |

OTHER PUBLICATIONS

Zhu et al "Synthesis and Characterization of Poly(butylene adipate-co-terephthalate) Catalyzed by Rare Earth Stearates", Chinese Journal of Chemistry, 2007, 25, 1581-1583 (Year: 2007).*
Uwe Witt et al "Studies on sequence distribution of aliphatic / aromatic copolyesters by high-resolution 13C nuclear magnetic resonance spectroscopy for evaluation of biodegradability", Macromol. Chem. Phys. 197, 1525-1535 (1996) (Year: 1996).*
Uwe Witt et al "New Biodegradable Polyester-Copolymers from Commodity Chemicals with Favorable Use Properties", Journal of Environmental Polymer Degradation, Vot. 3, No. 4, 1995. (Year: 1995).*
Abis et al "NMR investigation of some aromatic copolyesters", Mokromol. Chem, 193, 18j9- J866 (/992) (Year: 1992).*
Extended European Search report on the European Patent Application No. 23174354.3 issued by the European Patent Office on Jul. 25, 2023.
Piotr Rychter et al., Study of Aliphatic-Aromatic Copolyester Degradation in Sandy Soil and Its Ecotoxicological Impact, Biomacromolecules, vol. 11, No. 4, Mar. 1, 2010, pp. 839-847.
International Search Report on the International Patent Application No. PCT/KR2023/004888 issued by the International Searching Authority on Aug. 7, 2023.

* cited by examiner

*Primary Examiner* — Frances Tischler
*Assistant Examiner* — Gennadiy Mesh
(74) *Attorney, Agent, or Firm* — IP & T GROUP LLP

(57) ABSTRACT

Disclosed is an eco-friendly biodegradable polyester resin composition, including: a polyester resin including a diol, an aromatic dicarboxylic acid and an aliphatic dicarboxylic acid, wherein an alternating ratio of the polyester resin is 0.3 to 0.7, wherein the alternating ratio is a ratio of a diol, bonded between the aromatic dicarboxylic acid and the aliphatic dicarboxylic acid, among the diol. The diol may include 1,4-butanediol; the aromatic dicarboxylic acid may include terephthalic acid or dimethyl terephthalate; and the aliphatic dicarboxylic acid may include adipic acid. When the biodegradable polyester resin composition is dried at 80° C., placed in a stainless steel mold, and compressed at 210° C. under a pressure of 10 MPa for 3 minutes to produce a polyester sheet having a thickness of 300 μm, the sheet has a tensile strange range from 40 MPa to 60 MPa, an elongation at break range from 800% to 1100%, and Young's modulus range from 20 MPa to 80 MPa.

12 Claims, 2 Drawing Sheets

BIODEGRADABLE POLYESTER RESIN COMPOSITION, BIODEGRADABLE POLYESTER FILM INCLUDING THE SAME AND BIODEGRADABLE MOLDED ARTICLE INCLUDING BIODEGRADABLE POLYESTER RESIN COMPOSITION

CROSS-REFERENCE TO RELATED APPLICATION

This application claims priority to and the benefit of Korean Patent Application Nos. 10-2022-0062451, filed on May 21, 2022, and 10-2022-0062452, filed on May 21, 2022, the disclosure of which is incorporated herein by reference in its entirety.

BACKGROUND OF THE INVENTION

1. Field of the Invention

Embodiments relate to a biodegradable polyester resin composition, a biodegradable polyester film including the same and a biodegradable molded article including the biodegradable polyester resin composition.

2. Description of Related Art

Recently, a solution to the handling various household items, especially disposable products, is required as concerns about environmental problems increase. Specifically, polymeric materials are inexpensive and have excellent processability properties, so they are widely used to manufacture various products such as films, fibers, packaging materials, bottles, containers, etc. However, polymer materials have the disadvantage that harmful substances are emitted when incinerated when the lifespan of a product is over, and it takes hundreds of years depending on the types thereof to completely decompose them naturally.

To address this concern, research on biodegradable polymers that are decomposed within a short period of time is being actively conducted. As examples of biodegradable polymers, polylactic acid (PLA), polybutyleneadipate terephthalate (PBAT), polybutylene succinate (PBS), and the like are being used.

Such biodegradable resin compositions are described in Korean Patent Application No. 2012-0103158, and the like.

SUMMARY OF THE INVENTION

Therefore, the present disclosure has been made in view of the above problems, and it is an object of the present disclosure to provide a biodegradable polyester resin composition having improved biodegradability, hydrolysis resistance and improved mechanical properties, a biodegradable polyester film including the biodegradable polyester resin composition and a biodegradable molded article including the biodegradable polyester resin composition.

In accordance with an aspect of the present disclosure, the above and other objects can be accomplished by the provision of A biodegradable polyester resin composition, including: a polyester resin including a diol, an aromatic dicarboxylic acid and an aliphatic dicarboxylic acid, wherein an alternating ratio of the polyester resin is 0.37 to 0.59, wherein the alternating ratio is a ratio of a diol, bonded between the aromatic dicarboxylic acid and the aliphatic dicarboxylic acid, among the diol.

In the biodegradable polyester resin composition according to an embodiment, the alternating ratio may be 0.4 to 0.56.

In the biodegradable polyester resin composition according to an embodiment, the alternating ratio may be 0.45 to 0.53.

In the biodegradable polyester resin composition according to an embodiment, the diol may include 1,4-butanediol, the aromatic dicarboxylic acid may include terephthalic acid or dimethyl terephthalate, and the aliphatic dicarboxylic acid may include adipic acid.

In the biodegradable polyester resin composition according to an embodiment, a hard segment ratio of the biodegradable polyester resin composition may be about 0.2 to about 0.3, wherein the hard segment ratio is a ratio of a diol, bonded between the aromatic dicarboxylic acid and the aromatic dicarboxylic acid, among the diol.

In the biodegradable polyester resin composition according to an embodiment, a soft segment ratio of the biodegradable polyester resin composition may be about 0.21 to about 0.31, wherein the soft segment ratio is a ratio of a diol, bonded between the aliphatic dicarboxylic acid and the aliphatic dicarboxylic acid, among the diol.

In the biodegradable polyester resin composition according to an embodiment, the soft segment ratio may be larger than the hard segment ratio.

In the biodegradable polyester resin composition according to an embodiment, a biodegradability after nine weeks of the biodegradable polyester resin composition may be 85% or more, wherein the biodegradability after nine weeks is measured by a measurement method below:
[Measurement Method]
the biodegradability after nine weeks is a molecular weight reduction rate compared to an initial molecular weight of the biodegradable polyester resin composition when the biodegradable polyester resin composition is placed at a temperature of 60° C. and a humidity of 90% for 9 weeks under a composting condition.

In the biodegradable polyester resin composition according to an embodiment, a biodegradability after nine weeks per aliphatic carboxylic acid may be 1.7 or more, wherein the biodegradability after nine weeks per aliphatic carboxylic acid is obtained by dividing the biodegradability after nine weeks by mol % of the aliphatic carboxylic acid among the total dicarboxylic acids.

In accordance with another aspect of the present disclosure, there is provided a biodegradable polyester resin composition, including: a polyester resin including a diol, an aromatic dicarboxylic acid and an aliphatic dicarboxylic acid, wherein a hard segment ratio of the polyester resin is 0.2 to 0.3, wherein the hard segment ratio is a ratio of a diol, bonded between the aromatic dicarboxylic acid and the aliphatic dicarboxylic acid, among the diol.

In the biodegradable polyester resin composition according to an embodiment, the hard segment ratio may be 0.21 to 0.28.

In the biodegradable polyester resin composition according to an embodiment, the hard segment ratio may be 0.22 to 0.27.

In the biodegradable polyester resin composition according to an embodiment, a tensile strength measured by a measurement method below may be 40 MPa to 60 MPa:
[Measurement Method]
the biodegradable polyester resin composition is dried at 80° C., placed in a stainless steel mold, and compressed at 210° C. under a pressure of 10 MPa for 3 minutes to produce a polyester sheet having a thickness of 300 μm, and a tensile strength of the polyester sheet is measured.

In the biodegradable polyester resin composition according to an embodiment, an elongation at break of the polyester sheet may be about 800% to about 1100%.

In accordance with yet another aspect of the present disclosure, there is provided a biodegradable molded article, including: a polyester resin including a diol, an aromatic dicarboxylic acid and an aliphatic dicarboxylic acid, wherein an alternating ratio of the polyester resin is 0.37 to 0.59, wherein the alternating ratio is a ratio of a diol, bonded between the aromatic dicarboxylic acid and the aliphatic dicarboxylic acid, among the diol.

In the biodegradable molded article according to an embodiment, a hard segment ratio of the biodegradable molded article may be about 0.2 to about 0.3, wherein the hard segment ratio is a ratio of a diol, bonded between the aromatic dicarboxylic acid and the aromatic dicarboxylic acid, among the diol.

In the biodegradable molded article according to an embodiment, a soft segment ratio of the biodegradable molded article may be about 0.21 to about 0.31, wherein the soft segment ratio is a ratio of a diol, bonded between the aliphatic dicarboxylic acid and the aliphatic dicarboxylic acid, among the diol.

In the biodegradable molded article according to an embodiment, a tensile strength of the biodegradable molded article may be 40 MPa to 60 MPa.

In the biodegradable molded article according to an embodiment, an elongation at break of the biodegradable molded article may be about 800% to about 1100%.

In the biodegradable molded article according to an embodiment, the diol may include 1,4-butanediol, the aromatic dicarboxylic acid may include terephthalic acid or dimethyl terephthalate, and the aliphatic dicarboxylic acid may include adipic acid.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
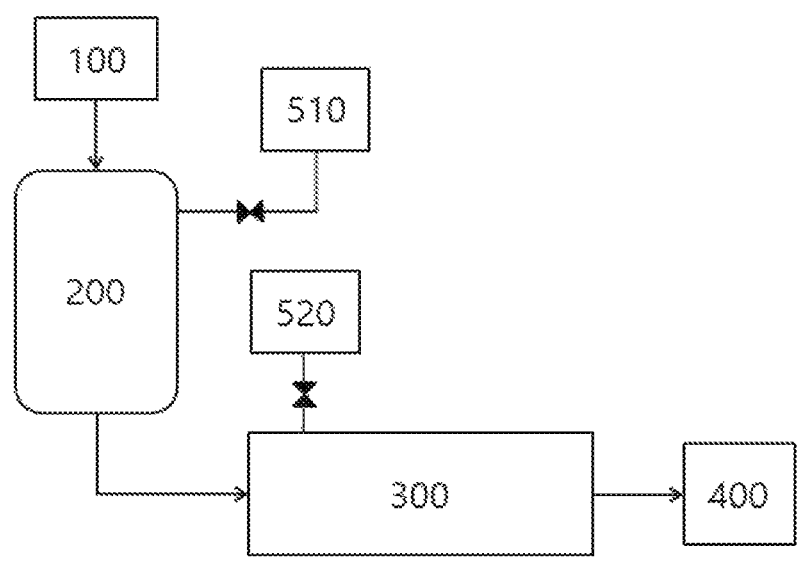
FIG. 1 is a diagram schematically illustrating an apparatus for producing a polyester resin composition according to one embodiment.

Hereinafter, the present disclosure will be described in more detail with reference to the following embodiments. The scope of the present disclosure is not limited to the following embodiments and covers modifications and equivalents of the technological aspects disclosed herein.

In the specification, when a certain part "includes" a certain component, this indicates that the part may further include another component instead of excluding another component unless there is no different disclosure.

In addition, it should be understood that all numerical ranges representing physical property values, dimensions, etc. of components described in this specification are modified by the term 'about' in all cases unless otherwise specified, whereby 'about' represents standard deviations in the accuracy of the numerical ranges, defined herein as less than 2% of the values given (or the closest integral value when the range is expressed as a range of whole numbers). Furthermore, besides the disclosed ranges, the present disclosure includes any intervening ranges of those described.

In this specification, terms such as first, second, primary, and secondary are used to describe various components, and the components are not limited by the terms. The terms are only used for the purpose of distinguishing one component from another.

In this specification, the term ppm is a unit based on mass. One ppm is 1 in 1 million of the total mass. That is, one ppm is 0.0001 wt % based on the total mass.

The biodegradable polyester resin composition according to one embodiment includes a biodegradable polyester resin. The biodegradable polyester resin composition according to one embodiment may include the biodegradable polyester resin alone or together with other resins or additives.

The biodegradable polyester resin includes a diol, an aromatic dicarboxylic acid and an aliphatic dicarboxylic acid. The biodegradable polyester resin may include a diol residue, an aromatic dicarboxylic acid residue and an aliphatic dicarboxylic acid residue. The diol residue can be derived from the diol, the aromatic dicarboxylic acid residue can be derived from the aromatic dicarboxylic acid, and the aliphatic dicarboxylic acid residue can be derived from the aliphatic dicarboxylic acid. The biodegradable polyester resin may include a diol component, an aromatic dicarboxylic acid component and an aliphatic dicarboxylic acid component. Likewise, the diol component may be derived from the diol, the aromatic dicarboxylic acid component may be derived from the aromatic dicarboxylic acid, and the aliphatic dicarboxylic acid component may be derived from the aliphatic dicarboxylic acid.

In a description of the biodegradable polyester resin composition according to another embodiment, a diol residue may be expressed as a diol. In the biodegradable polyester resin, a dicarboxylic acid residue may be expressed as dicarboxylic acid. In addition, the residue may be expressed as a component.

The diol may be an aliphatic diol. The diol may be a bio-derived diol. The diol may be at least one or more selected from the group consisting of ethanediol, 1,2-propanediol, 1,3-propanediol, 2-methyl-1,3-propanediol, 2,2-dimethyl-1,3-propanediol, 2,2-diethyl-1,3-propanediol, 2-ethyl-2-isobutyl-1,3-propanediol, 1,2-butanediol, 1,4-butanediol, 1,5-pentanediol, 3-methyl-1,5-pentanediol, 2,2,4-trimethyl-1,3-pentanediol, 1,6-hexanediol, 2-ethyl-1,3-hexanediol, 2,4-dimethyl-2-ethyl-1,3-hexanediol, 2,2,4-trimethyl-1,6-hexanediol, 2-methyl-1,8-octanediol, 1,9-nonanediol, 1,10-decanediol and 1,12-octadecanediol or derivatives thereof.

The diol may be at least one or more selected from the group consisting of 1,4-butanediol, 1,2-ethanediol, 1,3-propanediol, diethylene glycol and neopentyl glycol or derivatives thereof.

The diol may be at least one or more selected from the group consisting of 1,4-butanediol, 1,2-ethanediol, 1,3-propanediol or derivatives thereof.

The diol may include 1,4-butanediol or a derivative thereof.

The aromatic dicarboxylic acid may be at least one or more selected from the group consisting of phthalic acid, terephthalic acid, isophthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyl dicarboxylic acid, 4,4'-diphenyl ether dicarboxylic acid, anthracen dicarboxylic acid, and phenanthren dicarboxylic acid or derivatives thereof.

The aromatic dicarboxylic acid may be at least one or more selected from the group consisting of terephthalic acid, dimethyl terephthalate, 2,6-naphthalene dicarboxylic acid, isophthalic acid or derivatives thereof.

The aromatic dicarboxylic acid may include terephthalic acid, dimethyl terephthalate or a derivative thereof.

The aliphatic dicarboxylic acid may be at least one or more selected from the group consisting of oxalic acid, malonic acid, succinic acid, maleic acid, fumaric acid, glutaric acid, adipic acid, pimelic acid, serveric acid, azelaic acid, sebacic acid, dodecanedicarboxylic acid and 1,4-cyclohexanedicarboxylic acid or derivatives thereof.

The aliphatic dicarboxylic acid may be at least one or more selected from the group consisting of adipic acid, succinic acid and sebacic acid or derivatives thereof.

The aliphatic dicarboxylic acid may include an adipic acid or a derivative thereof.

In the biodegradable polyester resin, a molar ratio of all diol residues including the diol to all dicarboxylic acid residues including the aromatic dicarboxylic acid and the aliphatic dicarboxylic acid may range from about 1:0.9 to about 1:1.1. A molar ratio of all diol residues to all dicarboxylic acid residues may range from about 1:0.95 to about 1:1.05.

In the biodegradable polyester resin, a molar ratio of the aromatic dicarboxylic acid residue to the aliphatic dicarboxylic acid residue may range from about 3:7 to about 7:3. In the biodegradable polyester resin, a molar ratio of the aromatic dicarboxylic acid residue to the aliphatic dicarboxylic acid residue may range from about 3.3:6.7 to about 6.7:3.3. In the biodegradable polyester resin, a molar ratio of the aromatic dicarboxylic acid residue to the aliphatic dicarboxylic acid residue may range from about 4:6 to about 6:4. In the biodegradable polyester resin, a molar ratio of the aromatic dicarboxylic acid residue to the aliphatic dicarboxylic acid residue may range from about 4.2:5.8 to about 5:5.

The biodegradable polyester resin may include a diol residue derived from 1,4-butanediol in a content of about 90 mol % or more based on the total diol. The biodegradable polyester resin may include a diol residue derived from 1,4-butanediol in a content ranging from about 95 mol % or more based on the total diol. The biodegradable polyester resin may include a diol residue derived from 1,4-butanediol in a content ranging from about 98 mol % or more based on the total diol.

The biodegradable polyester resin may include an aromatic dicarboxylic acid residue derived from terephthalic acid or dimethyl terephthalate in a content ranging from about 30 mol % to about 70 mol % based on the total dicarboxylic acid. The biodegradable polyester resin may include an aromatic dicarboxylic acid residue derived from terephthalic acid or dimethyl terephthalate in a content ranging from about 35 mol % to about 65 mol % based on the total dicarboxylic acid. The biodegradable polyester resin may include a dicarboxylic acid residue derived from terephthalic acid or dimethyl terephthalate in a content ranging from about 40 mol % to about 59 mol % based on the total dicarboxylic acid. The biodegradable polyester resin may include an aromatic dicarboxylic acid residue derived from terephthalic acid or dimethyl terephthalate in a content ranging from about 43 mol % to about 53 mol % based on the total dicarboxylic acid.

The biodegradable polyester resin may include an aliphatic dicarboxylic acid residue derived from adipic acid in a content ranging from about 30 mol % to about 70 mol % based on the total dicarboxylic acid. The biodegradable polyester resin may include an aliphatic dicarboxylic acid residue derived from adipic acid in a content ranging from about 35 mol % to about 65 mol % based on the total dicarboxylic acid. The biodegradable polyester resin may include an aliphatic dicarboxylic acid residue derived from adipic acid in a content ranging from about 41 mol % to about 60 mol % based on the total dicarboxylic acid. The biodegradable polyester resin may include an aliphatic dicarboxylic acid residue derived from adipic acid in a content ranging from about 47 mol % to about 57 mol % based on the total dicarboxylic acid.

In addition, the biodegradable polyester resin may include at least one first block and at least one second block. See for example the chemical blocks illustrated in formula (1), formula (2), formula (3), formula (4), and formula (5) below. The biodegradable polyester resin may have a molecular structure in which the first block and the second block are alternately bonded.

The first block may include the diol residue and the aromatic dicarboxylic acid residue. The first block may be formed by esterification of the diol and the aromatic dicarboxylic acid. The first block may include only the diol residue and the aromatic dicarboxylic acid residue. The first block may include only repeating units formed by the esterification of the diol and the aromatic dicarboxylic acid. That is, the first block may mean the sum of repeating units of the diol and the aromatic dicarboxylic acid before being combined with the aliphatic dicarboxylic acid.

The second block may include the diol residue and the aliphatic dicarboxylic acid residue. The second block may be formed by esterification of the diol and the aliphatic dicarboxylic acid. The second block may include only the diol residue and the aliphatic dicarboxylic acid residue. The second block may include only repeating units formed by the esterification of the diol and the aliphatic dicarboxylic acid. That is, the second block may mean the sum of repeating units of the diol and the aliphatic dicarboxylic acid before being combined with the aromatic dicarboxylic acid.

In the biodegradable polyester resin, a ratio (X/Y) of the number (X) of the first blocks to the number (Y) of the second blocks may range from about 0.5 to about 1.5. In the biodegradable polyester resin, the ratio (X/Y) of the number (X) of the first blocks to the number (Y) of the second blocks may range from about 0.6 to about 1.4. In the biodegradable polyester resin, the ratio (X/Y) of the number (X) of the first blocks to the number (Y) of the second blocks may range from about 0.7 to about 1.3. In the biodegradable polyester resin, the ratio (X/Y) of the number (X) of the first blocks to the number (Y) of the second blocks may range from about 0.75 to about 1.2. In addition, in the biodegradable polyester resin, the ratio (X/Y) of the number (X) of the first blocks to the number (Y) of the second blocks may range from 0.8 to 1. The number of the first blocks may be smaller than the number of the second blocks.

The number of the first blocks may range from about 30 to about 300. The number of the first blocks may range from about 40 to about 250. The number of the first blocks may range from about 50 to about 220. The number of the first blocks may range from about 60 to about 200. The number of the first blocks may range from about 70 to about 200. The number of the first blocks may range from about 75 to about 200.

The number of the first blocks may vary depending upon the content of the aromatic dicarboxylic acid, the molecular weight of the biodegradable polyester resin and an alternation ratio to be described below. That is, the number of the first blocks may increase as a molar ratio of the aromatic dicarboxylic acid increases, as the molecular weight of the biodegradable polyester resin increases, and as an alternation ratio to be described below increases.

The number of the second blocks may range from about 30 to about 300. The number of the second blocks may range from about 40 to about 250. The number of the second blocks may range from about 50 to about 220. The number of the second blocks may range from about 60 to about 200. The number of the second blocks may range from about 70 to about 200. The number of the second blocks may range from about 75 to about 200.

The number of the second blocks may vary depending upon the content of the aliphatic dicarboxylic acid, the molecular weight of the biodegradable polyester resin and an alternating degree to be described below. That is, the number of the first blocks may increase as the molecular weight of the biodegradable polyester resin increases, the molar ratio of the aliphatic dicarboxylic acid increases, and an alternating degree to be described below increases.

When the biodegradable polyester resin includes the first block and the second block within the range, the biodegradable polyester resin composition according to one embodiment may have an appropriate biodegradability while having an appropriate mechanical strength. See tables and examples below. In addition, when the biodegradable polyester resin includes the first block and the second block within the range, the biodegradable polyester resin composition according to another embodiment may have improved (an increased) stiffness while having improved (greater) flexibility. Accordingly, the biodegradable polyester resin composition according to this embodiment may be used for an injection-molded article, etc. In addition, when the biodegradable polyester resin includes the first block and the second block within the range, the biodegradable polyester resin composition according to this embodiment may have appropriate biodegradability while having appropriate durability to ultraviolet light, and the like.

The first block may be represented by Formula 1 below:

[Formula 1]

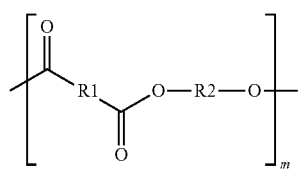

where R1 is a substituted or unsubstituted arylene group having 6 to 20 carbon atoms, R2 is a substituted or unsubstituted alkylene group having 1 to 20 carbon atoms, and m is 1 to 20.

R1 may be a substituted or unsubstituted phenylene group, and R2 may be a butylene group.

The second block may be represented by Formula 2 below:

[Formula 2]

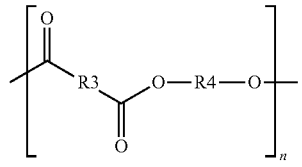

where R3 and R4 are each independently a substituted or unsubstituted alkylene group having 1 to 20 carbon atoms, and n is 1 to 20.

R3 and R4 may be a butylene group.

The biodegradable polyester resin may have a structure in which the first block and the second block are alternately bonded to each other. The biodegradable polyester resin may be represented by Formula 3 below.

[Formula 3]

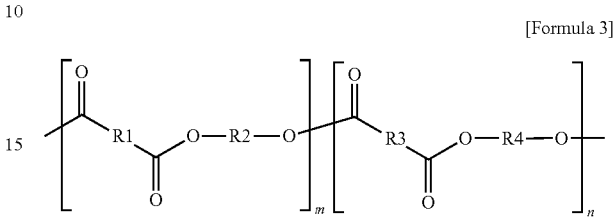

where R1 is a substituted or unsubstituted arylene group having 6 to 20 carbon atoms, R2 is a substituted or unsubstituted alkylene group having 1 to 20 carbon atoms, and m is 1 to 20. In addition, R3 and R4 are each independently a substituted or unsubstituted alkylene group having 1 to 20 carbon atoms, and n is 1 to 20.

The diol residue may include a residue of 1,4-butanediol or derivative thereof, the aromatic dicarboxylic acid residue may include a residue of terephthalic acid or derivative thereof, and the aliphatic dicarboxylic acid residue may include a residue of adipic acid or derivative thereof.

In one embodiment, the biodegradable polyester resin may include a first block including a residue of 1,4-butanediol or derivative thereof and a residue of terephthalic acid or derivative thereof.

Alternatively, the biodegradable polyester resin may include a first block including a residue of 1,4-butanediol or derivative thereof and a residue of dimethyl terephthalate or derivative thereof.

The biodegradable polyester resin may include a second block including a residue of 1,4-butanediol or derivative thereof and a residue of adipic acid or derivative thereof.

Alternatively, the biodegradable polyester resin may include a second block including a residue of 1,4-butanediol or derivative thereof and a residue of succinic acid or derivative thereof.

A biodegradable polyester resin according to another embodiment of the present disclosure may include a first block including a residue of 1,4-butanediol or derivative thereof and a residue of terephthalic acid or derivative thereof, and a second block including a residue of 1,4-butanediol or derivative thereof and a residue of adipic acid or derivative thereof.

The first block may be represented by Formula 4 below, and the second block may be represented by Formula 5 below:

[Formula 4]

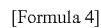

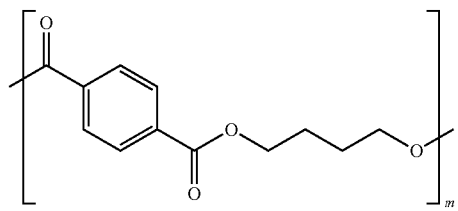

where m is 1 to 20.

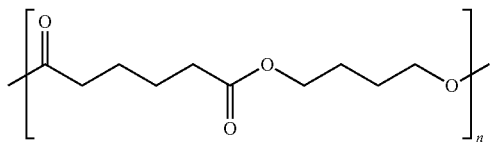

where n is 1 to 20.

In one embodiment, the biodegradable polyester resin may be represented by Formula 6 below:

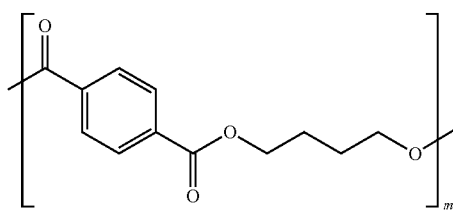 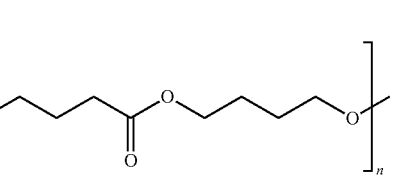

where m is 1 to 20, and n is 1 to 20.

When the first block and the second block satisfy the constitution above, a biodegradable polyester resin with these blocks may result in a biodegradable polyester sheet, film or molded article having excellent biodegradability and water degradability and improved properties. See tables and examples below.

In addition, when the biodegradable polyester resin includes the first block and the second block within the range, the biodegradable polyester resin composition according to another embodiment may have appropriate mechanical properties and appropriate UV resistance.

Since the first and second blocks have these characteristics, the mechanical properties of the biodegradable polyester resin composition (according to yet another embodiment) may be improved.

Since the first and second blocks have these characteristics, the biodegradable polyester resin composition (according to still another embodiment) may have appropriate UV resistance.

Since the first and second blocks have these characteristics, the biodegradable polyester resin composition (according to one embodiment) may have an appropriate biodegradation rate.

Since the first and second blocks have these characteristics, the biodegradable polyester resin composition (according to a further embodiment) may have an appropriate hydrolysis rate. See tables and examples below.

The biodegradable polyester resin may include the following bonding structures:

[Bonding Structure 1]
  Aromatic dicarboxylic acid-diol-aliphatic dicarboxylic acid-
[Bonding Structure 2]
  Aromatic dicarboxylic acid-diol-aromatic dicarboxylic acid-
[Bonding Structure 3]
  Aliphatic dicarboxylic acid-diol-aliphatic dicarboxylic acid- The diol included in Bonding Structure 1 is formed between the aromatic dicarboxylic acid and the aliphatic dicarboxylic acid and bonded to the aromatic dicarboxylic acid and the aliphatic dicarboxylic acid. The diol included in Bonding Structure 1 may be formed between the aromatic dicarboxylic acid and the aliphatic dicarboxylic acid and directly esterified with the aromatic dicarboxylic acid and the aliphatic dicarboxylic acid.

In addition, the diol included in Bonding Structure 2 is formed between the aromatic dicarboxylic acid and the aromatic dicarboxylic acid (that is formed between two aromatic dicarboxylic acid groups) and bonded to the two aromatic dicarboxylic acid groups. The diol included in Bonding Structure 2 may be formed between the aromatic dicarboxylic acid and the aromatic dicarboxylic acid and may be directly esterified with the aromatic dicarboxylic acid and the aromatic dicarboxylic acid.

In addition, the diol included in Bonding Structure 3 is formed between one aliphatic dicarboxylic acid and another aliphatic dicarboxylic acid (that is formed between two aliphatic dicarboxylic acid groups) and bonded to the aliphatic dicarboxylic acid and the aliphatic dicarboxylic acid (that is bonded between the two aliphatic dicarboxylic acid groups). The diol included in Bonding Structure 3 may be formed between the aliphatic dicarboxylic acid and the aliphatic dicarboxylic acid and may be directly esterified with the aliphatic dicarboxylic acid and the aliphatic dicarboxylic acid.

In one example of a biodegradable polyester resin, Bonding Structure 1 may be represented by Formula 7 below:

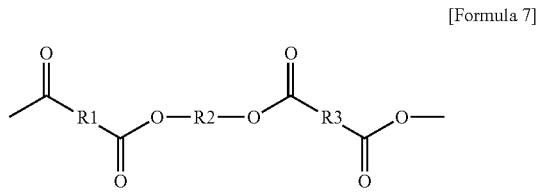

where R1 is a substituted or unsubstituted arylene group having 6 to 20 carbon atoms, R2 is a substituted or unsubstituted alkylene group having 1 to 20 carbon atoms, and R3 is a substituted or unsubstituted alkylene group having 1 to 20 carbon atoms.

In another example of a biodegradable polyester resin, Bonding Structure 2 may be represented by Formula 8 below:

[Formula 8]

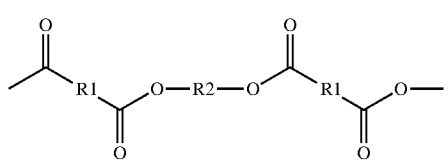

Likewise, R1 is a substituted or unsubstituted arylene group having 6 to 20 carbon atoms, and R2 is a substituted or unsubstituted alkylene group having 1 to 20 carbon atoms.

In another example of a biodegradable polyester resin, Bonding Structure 3 may be represented by Formula 9 below:

[Formula 9]

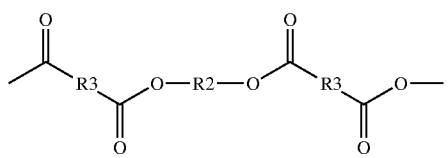

where R2 is a substituted or unsubstituted alkylene group having 1 to 20 carbon atoms, and R3 is a substituted or unsubstituted alkylene group having 1 to 20 carbon atoms.

In addition, Bonding Structure 1 may be represented by Formula 10 below:

[Formula 10]

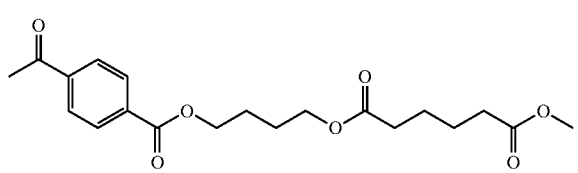

In addition, Bonding Structure 2 may be represented by Formula 11 below:

[Formula 11]

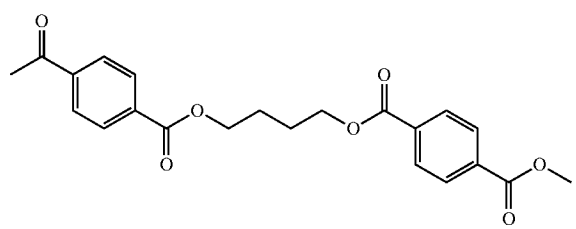

In addition, Bonding Structure 3 may be represented by Formula 12 below:

[Formula 12]

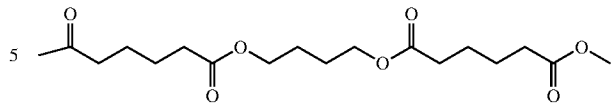

In one embodiment, the biodegradable polyester resin may have an alternating ratio.

The alternating ratio refers to a ratio of a diol bonded between the aromatic dicarboxylic acid and the aliphatic dicarboxylic acid among the diols. That is, the alternating ratio may be a ratio of a diol included in Bonding Structure 1 among the diols. The alternating ratio may be obtained by dividing the number of moles of a diol included in Bonding Structure 1 by the sum of a) the number of moles of a diol included in Bonding Structure 1, b) the number of moles of a diol included in Bonding Structure 2 and c) the number of moles of a diol included in Bonding Structure 3.

That is, the alternating ratio may be a ratio of a diol bonded between the heterogeneous dicarboxylic acids among the total diols.

The alternating ratio may be calculated according to Equation 1 below:

$$\text{Alternating ratio} = \frac{DM1}{DM1 + DM2 + DM3} \quad \text{[Equation 1]}$$

where DM1 is a molar ratio of a diol included in Bonding Structure 1, DM2 is a molar ratio of a diol included in Bonding Structure 2, and DM3 is a molar ratio of a diol included in Bonding Structure 3.

In one example of a biodegradable polyester resin, the alternating ratio may range from about 0.3 to about 0.7. In another example of a biodegradable polyester resin, the alternating ratio may range from about 0.37 to about 0.59. In still another example of a biodegradable polyester resin, the alternating ratio may range from about 0.4 to about 0.56. In yet another example of a biodegradable polyester resin, the alternating ratio may range from about 0.45 to about 0.53.

In addition, the biodegradable polyester resin may include a hard segment ratio.

The hard segment ratio refers to a ratio of a diol bonded between one aromatic dicarboxylic acid and another aromatic dicarboxylic acid among the diols (that is bonded between two aromatic dicarboxylic acid groups).

The hard segment ratio may be a molar ratio of a diol included in Bonding Structure 2 among the total diols. The hard segment ratio may be obtained by dividing the number of moles of a diol included in Bonding Structure 2 by the sum of a) the number of moles of a diol included in Bonding Structure 1, b) the number of moles of a diol included in Bonding Structure 2 and c) the number of moles of a diol included in Bonding Structure 3.

The hard segment ratio may be represented by Equation 2 below:

$$\text{Hard segment ratio} = \frac{DM2}{DM1 + DM2 + DM3} \quad \text{[Equation 2]}$$

where DM1 is a molar ratio of a diol included in Bonding Structure 1, DM2 is a molar ratio of a diol included in Bonding Structure 2, and DM3 is a molar ratio of a diol included in Bonding Structure 3.

The hard segment ratio may range from about 0.15 to about 0.35. The hard segment ratio may range from about 0.2 to about 0.3. The hard segment ratio may range from about 0.21 to about 0.29. The hard segment ratio may range from about 0.22 to about 0.28.

In addition, the biodegradable polyester resin composition may include soft segments.

A soft segment ratio refers to a ratio of a diol bonded between one aliphatic dicarboxylic acid and another aliphatic dicarboxylic acid among the diols (that is bonded between two aliphatic dicarboxylic acid groups).

The soft segment ratio may be a molar ratio of a diol included in Bonding Structure 3 among the total diols. The soft segment ratio may be obtained by dividing the number of moles of a diol included in Bonding Structure 3 by the sum of a) the number of moles of a diol included in Bonding Structure 1, b) the number of moles of a diol included in Bonding Structure 2 and c) the number of moles of a diol included in Bonding Structure 3.

The soft segment ratio may be represented by Equation 3 below:

$$\text{Soft segment ratio} = \frac{DM3}{DM1 + DM2 + DM3} \quad \text{[Equation 3]}$$

where DM1 is a molar ratio of a diol included in Bonding Structure 1, DM2 is a molar ratio of a diol included in Bonding Structure 2, and DM3 is a molar ratio of a diol included in Bonding Structure 3.

The soft segment ratio may range from about 0.19 to about 0.29. The soft segment ratio may range from about 0.21 to about 0.29. The soft segment ratio may range from about 0.22 to about 0.29. The hard segment ratio may be about 0.21 to about 0.28. The soft segment ratio may range from about 0.22 to about 0.28. The soft segment ratio may range from about 0.25 to about 0.28.

The soft segment ratio may be larger than the hard segment ratio.

A ratio of the hard segments to the soft segments may range from about 0.92 to 10 about 0.99. That is, according to Equation 2 and Equation 3, DM2 divided by DM3 may range from about 0.92 to about 0.99.

The alternating ratio, the hard segment ratio and the soft segment ratio may be measured by nuclear magnetic resonance spectroscopy. The biodegradable polyester resin composition according to one embodiment may be dissolved in a solvent such as CDCl3, and may be analyzed by $^1$H-NMR and/or $^{13}$C-NMR analysis using a nuclear magnetic resonance (NMR) instrument at room temperature.

When the diol is 1,4-butanediol, the aromatic dicarboxylic acid is terephthalic acid or dimethyl terephthalate, and the aliphatic dicarboxylic acid is adipic acid, analysis of the biodegradable polyester resin by the nuclear magnetic resonance spectroscopy may include a first peak, a second peak, a third peak, a fourth peak, a fifth peak, a sixth peak, a seventh peak, an eighth peak, a ninth peak, a tenth peak, and an eleventh peak.

For example, when the diol is 1,4-butanediol, the aromatic dicarboxylic acid is terephthalic acid or dimethyl terephthalate, and the aliphatic dicarboxylic acid is adipic acid, analysis of the biodegradable polyester resin by the nuclear magnetic resonance spectroscopy may include a peak derived from the diol of Bonding Structure 1, a peak derived from the diol of Bonding Structure 2 and a peak derived from the diol of Bonding Structure 3 at about 3.5 ppm to about 4.6 ppm.

The −ppm direction may be an upfield direction or a shielded direction. For example, −3.4 ppm may mean a position of 3.4 ppm in an upfield direction. For example, −3.4 ppm may mean a position of 3.4 ppm in a shielded direction. In a range of about 3.5 ppm to about 4.6 ppm, the first peak, the second peak, the third peak and the fourth peak may be defined in order from high ppm to low ppm. In addition, in a range of about −3.4 ppm to about −4.3 ppm based on the ppm of the ninth peak, the first peak, the second peak, the third peak and the fourth peak may be defined in order from high ppm to low ppm. Here, the first peak may be derived from the diol included in the second bonding unit, the second peak and the third peak may be derived from the diol included in the first bonding unit, and the fourth peak may be derived from the diol included in the third bonding unit.

In addition, analysis of the biodegradable polyester resin by the nuclear magnetic resonance spectroscopy may include a peak derived from the diol of Bonding Structure 1, a peak derived from the diol of Bonding Structure 2 and a peak derived from the diol of Bonding Structure 3 also at about 1.0 ppm to about 2.5 ppm.

In a range of about 1.0 ppm to about 2.5 ppm, the tenth peak, the fifth peak, the sixth peak, the seventh peak, the eighth peak and the eleventh peak may be defined in order from high ppm to low ppm. In a range of about −6.0 ppm to about −6.7 ppm based on the ppm of the ninth peak, the fifth peak, the sixth peak, the seventh peak, the eighth peak and the eleventh peak may be defined in order from high ppm to low ppm. Here, the fifth peak may be derived from the diol included in the second bonding unit, the sixth peak and the seventh peak may be derived from the diol included in the first bonding unit, and the eighth peak may be derived from the diol included in the third bonding unit.

In addition, in a range of about 7.5 ppm to about 8.5 ppm, the ninth peak may be formed. The ninth peak may be derived from the aromatic dicarboxylic acid. The ninth peak may be derived from an aromatic ring included in the aromatic dicarboxylic acid. The ninth peak may be derived from an aromatic ring included in the terephthalic acid or the dimethyl terephthalate.

The tenth peak and the eleventh peak may be derived from the aliphatic dicarboxylic acid. The tenth peak and the eleventh peak may be derived from the adipic acid.

The first peak may be located at about −3.6 ppm to about −3.68 ppm based on the ppm of the ninth peak. The second peak may be located at about −3.69 ppm to about −3.75 ppm based on the ppm of the ninth peak. The third peak may be located at about −3.9 ppm to about −3.97 ppm based on the ppm of the ninth peak. The fourth peak may be located at about −3.98 ppm to about −4.1 ppm based on the ppm of the ninth peak. The fifth peak may be located at about −6.0 ppm to about −6.19 ppm based on the ppm of the ninth peak. The sixth peak may be located at about −6.2 ppm to about −6.26 ppm based on the ppm of the ninth peak. The seventh peak may be located at about −6.27 ppm to about −6.34 ppm based on the ppm of the ninth peak. The eighth peak may be located at about −6.35 ppm to about −6.42 ppm based on the ppm of the ninth peak. The tenth peak may be located at about −5.6 ppm to about −5.8 ppm based on the ppm of the ninth peak. The eleventh peak may be located at about −6.421 ppm to about −6.5 ppm based on the ppm of the ninth peak. The position of the ninth peak based on ppm may be the position of each peak when the position of the ninth peak is 0 ppm.

In addition, the areas of the first peak, the second peak, the third peak, the fourth peak, the fifth peak, the sixth peak, the seventh peak, the eighth peak, the tenth peak and the eleventh peak may be normalized based on the area of the ninth peak. That is, when the area of the ninth peak is 1, the areas of the first peak, the second peak, the third peak, the fourth peak, the fifth peak, the sixth peak, the seventh peak, the eighth peak, the tenth peak and the eleventh peak may be relatively determined.

The alternating ratio may be derived by Equation 4 or 5 below:

$$\text{Alternating ratio} = \frac{PA2 + PA3}{PA1 + PA2 + PA3 + PA4} \qquad \text{[Equation 4]}$$

where PA1 is the area of the first peak, PA2 is the area of the second peak, PA3 is the area of the third peak, and PA4 is the area of the fourth peak $$\text{Alternating ratio} = \frac{PA6 + PA7}{PA5 + PA6 + PA7 + PA8} \qquad \text{[Equation 5]}$$

where PA5 is the area of the fifth peak, PA6 is the area of the sixth peak, PA7 is the area of the seventh peak, and PA8 is the area of the eighth peak.

The hard segment ratio may be derived by Equation 6 or 7 below:

$$\text{Hard segment ratio} = \frac{PA1}{PA1 + PA2 + PA3 + PA4} \qquad \text{[Equation 6]}$$

where PA1 is the area of the first peak, PA2 is the area of the second peak, PA3 is the area of the third peak, and PA4 is the area of the fourth peak.

$$\text{Hard segment ratio} = \frac{PA5}{PA5 + PA6 + PA7 + PA8} \qquad \text{[Equation 7]}$$

where PA5 is the area of the fifth peak, PA6 is the area of the sixth peak, PA7 is the area of the seventh peak, and PA8 is the area of the eighth peak.

The soft segment ratio may be derived by Equation 8 or 9 below:

$$\text{Soft segment ratio} = \frac{PA4}{PA1 + PA2 + PA3 + PA4} \qquad \text{[Equation 8]}$$

where PA1 is the area of the first peak, PA2 is the area of the second peak, PA3 is the area of the third peak, and PA4 is the area of the fourth peak.

$$\text{Soft segment ratio} = \frac{PA8}{PA5 + PA6 + PA7 + PA8} \qquad \text{[Equation 9]}$$

where PA5 is the area of the fifth peak, PA6 is the area of the sixth peak, PA7 is the area of the seventh peak, and PA8 is the area of the eighth peak.

The area of the first peak may range from about 0.35 to about 0.6. The area of the first peak may range from about 0.4 to about 0.55. The area of the first peak may range from about 0.43 to about 0.5 The area of the first peak may range from about 0.43 to about 0.52. The area of the first peak may range from about 0.45 to about 0.49.

The area of the second peak may range from about 0.37 to about 0.57. The area of the second peak may range from about 0.41 to about 0.54. The area of the second peak may range from about 0.45 to about 0.53. The area of the second peak may range from about 0.45 to about 0.55. The area of the second peak may range from about 0.47 to about 0.53.

The area of the third peak may range from about 0.37 to about 0.57. The area of the third peak may range from about 0.41 to about 0.54. The area of the third peak may range from about 0.45 to about 0.53. The area of the third peak may range from about 0.45 to about 0.55. The area of the third peak may range from about 0.47 to about 0.53.

The area of the fourth peak may range from about 0.4 to 0.7. The area of the fourth peak may range from about 0.45 to about 0.65. The area of the fourth peak may range from about 0.48 to about 0.6. The area of the fourth peak may range from about 0.48 to 0.60. The area of the fourth peak may range from about 0.50 to about 0.58.

The area of the fifth peak may range from about 0.35 to about 0.6. The area of the fifth peak may range from about 0.4 to about 0.55. The area of the fifth peak may range from 0.43 to about 0.53. The area of the fifth peak may range from about 0.43 to about 0.52. The area of the fifth peak may range from about 0.45 to about 0.49.

The area of the sixth peak may range from about 0.35 to about 0.6. The area of the sixth peak may range from about 0.4 to about 0.55. The area of the sixth peak may range from 0.43 to about 0.5. The area of the sixth peak may range from about 0.45 to about 0.55. The area of the sixth peak may range from about 0.47 to about 0.53.

The area of the seventh peak may range from about 0.41 to about 0.71. The area of the seventh peak may range from about 0.45 to about 0.65. The area of the seventh peak may range from about 0.48 to about 0.6. The area of the seventh peak may range from about 0.45 to about 0.55. The area of the seventh peak may range from about 0.47 to about 0.53.

The area of the eighth peak may range from about 0.4 to about 0.7. The area of the eighth peak may range from about 0.45 to about 0.65. The area of the eighth peak may range from about 0.48 to about 0.6. The area of the eighth peak may range from about 0.48 to 0.60. The area of the eighth peak may range from about 0.50 to about 0.58.

The area of the tenth peak may range from about 0.7 to about 2.5. The area of the tenth peak may range from 0.75 to about 2. The area of the tenth peak may range from 0.8 to about 1.5. The area of the tenth peak may range from about 1.0 to about 1.15. The area of the tenth peak may range from about 1.02 to about 1.13.

The area of the eleventh peak may range from about 0.7 to about 3.5. The area of the eleventh peak may range from about 0.7 to about 3. The area of the eleventh peak may range from 0.8 to about 2.5. The area of the eleventh peak may range from about 1.0 to about 1.15. The area of the eleventh peak may range from about 1.02 to about 1.13.

In addition, the sum of the area of the first peak, the area of the second peak, the area of the third peak and the area of the fourth peak may range from about 1.49 to about 2.44. The sum of the area of the first peak, the area of the second peak, the area of the third peak and the area of the fourth peak may range from about 1.81 to about 2.16. The sum of the area of the first peak, the area of the second peak, the area of the third peak and the area of the fourth peak may range from about 1.9 to about 2.2. The sum of the area of the first peak, the area of the second peak, the area of the third peak and the area of the fourth peak may range from about 1.95 to about 2.1. Here, the sum of the area of the first peak, the area of the second peak, the area of the third peak and the area of the fourth peak may mean the sum of the total number of ester bonds based on the number of terephthalic acids.

The sum of the area of the second peak and the area of the third peak may range from about 0.95 to about 1.10. The sum of the area of the second peak and the area of the third peak may range from about 0.98 to about 1.07. Here, the sum of the area of the first peak and the area of the third peak may mean the degree of extension of molecular bonds of the biodegradable polyester resin.

A ratio (the area of the fourth peak/the area of the first peak) of the area of the fourth peak to the area of the first peak may range from about 1.1 to about 1.3. A ratio of the area of the fourth peak to the area of the first peak may range from about 0.67 to about 2.00. A ratio of the area of the fourth peak to the area of the first peak may range from about 0.96 to about 1.40. A ratio of the area of the fourth peak to the area of the first peak may range from about 1.15 to about 1.25. A ratio of the area of the fourth peak to the area of the first peak may mean a ratio of soft segments to hard segments in the molecular structure of the biodegradable polyester resin. That is, the biodegradable polyester resin becomes softer as the ratio of the area of the fourth peak to the area of the first peak increases.

A ratio (the area of the fourth peak/the area of the third peak) of the area of the fourth peak to the area of the third peak may range from about 0.7 to about 1.89. A ratio of the area of the fourth peak to the area of the third peak may range from about 0.91 to about 1.33. A ratio of the area of the fourth peak to the area of the third peak may range from about 1.0 to about 1.2. A ratio of the area of the fourth peak to the area of the third peak may range from about 1.01 to about 1.1.

A ratio (the area of the first peak/the area of the second peak) of the area of the first peak to the area of the second peak may range from about 0.61 to about 1.62. A ratio of the area of the first peak to the area of the second peak may range from about 0.81 to about 1.11. A ratio of the area of the first peak to the area of the second peak may range from about 0.85 to about 0.95. A ratio of the area of the first peak to the area of the second peak may range from about 0.86 to about 0.94.

In addition, a ratio (the area of the fifth peak/the area of the first peak) of the area of the fifth peak to the area of the first peak may range from about 0.61 to about 1.71. A ratio of the area of the fifth peak to the area of the first peak may range from about 0.96 to about 1.40. A ratio of the area of the fifth peak to the area of the first peak may range from about 0.8 to about 1.2. A ratio of the area of the fifth peak to the area of the first peak may range from about 0.9 to about 1.1.

In addition, a ratio (the area of the sixth peak/the area of the second peak) of the area of the sixth peak to the area of the second peak may range from about 0.58 to about 1.71. A ratio of the area of the sixth peak to the area of the first peak may range from about 0.86 to about 1.16. A ratio of the area of the sixth peak to the area of the first peak may range from about 0.8 to about 1.2. A ratio of the area of the sixth peak to the area of the first peak may range from about 0.9 to about 1.1.

In addition, a ratio (the area of the seventh peak/the area of the third peak) of the area of the seventh peak to the area of the third peak may range from about 0.72 to about 1.92. A ratio of the area of the seventh peak to the area of the third peak may range from about 0.91 to about 1.33. A ratio of the area of the seventh peak to the area of the third peak may range from about 0.8 to about 1.2. A ratio of the area of the seventh peak to the area of the third peak may range from about 0.9 to about 1.1.

In addition, a ratio (the area of the eighth peak/the area of the fourth peak) of the area of the eighth peak to the area of the fourth peak may range from about 0.59 to about 1.75. A ratio of the area of the eighth peak to the area of the fourth peak may range from about 0.80 to about 1.25. A ratio of the area of the eighth peak to the area of the fourth peak may range from about 0.8 to about 1.2. A ratio of the area of the eighth peak to the area of the fourth peak may range from about 0.9 to about 1.1.

Since the biodegradable polyester resin has the above-described molecular structure, the biodegradable polyester resin composition (according to one embodiment) may be more advantageous in providing a biodegradable polyester sheet, film or molded article having excellent biodegradability and water degradability and improved physical properties. See tables and examples herein.

In addition, since the biodegradable polyester resin has the above-described molecular structure, the biodegradable polyester resin composition (according to another embodiment) may have appropriate mechanical properties and appropriate UV resistance.

Since the biodegradable polyester resin has the above-described molecular structure, the mechanical properties of the biodegradable polyester resin composition (according to yet another embodiment) may be improved.

Since the biodegradable polyester resin has the above-described molecular structure, the biodegradable polyester resin composition (according to still another embodiment) may have appropriate UV resistance.

Since the first and second blocks have the above-noted characteristics, the biodegradable polyester resin composition (according to one embodiment) may have an appropriate biodegradation rate.

Since the biodegradable polyester resin has the above-described molecular structure, the biodegradable polyester resin composition (according to one embodiment) may have an appropriate hydrolysis rate.

The biodegradable polyester resin may further include a branching agent. The branching agent may include at least one or more selected from the group consisting of a trihydric or higher alcohol, an anhydride and a trihydric or higher carboxylic acid. The branching agent may react with the diol, the aromatic dicarboxylic acid and the aliphatic dicarboxylic acid. Accordingly, the branching agent may be included as a part of the molecular structure of the biodegradable polyester resin.

The trihydric or higher alcohol may be at least one or more selected from the group consisting of glycerol, pentaerythritol or trimethylolpropane.

The trihydric or higher carboxylic acid may be at least one or more selected from the group consisting of methane tricarboxylic acid, ethanetricarboxylic acid, citric acid, benzene-1,3,5-tricarboxylic acid, 5-sulfo-1,2,4-benzenetricarboxylic acid, ethane-1,1,2,2-tetracarboxylic acid, propane-1,1,2,3-tetracarboxylic acid, butane-1,2,3,4-tetracarboxylic acid, cyclopentane-1,2,3,4-tetracarboxylic acid and benzene-1,2,4,5-tetracarboxylic acid.

The anhydride may include at least one or more selected from the group consisting of trimellitic anhydride, succinic anhydride, methylsuccinic anhydride, ethylsuccinic anhydride, 2,3-butanedicarboxylic anhydride, 2,4-pentanedicarboxylic anhydride, 3,5-heptanedicarboxylic anhydride, 1,2,3,4-butanetetracarboxylic dianhydride, maleic anhydride, dodecylsuccinic anhydride and pyromellitic anhydride.

The branching agent may be included in a content ranging from about 0.1 wt % to about 5 wt % in the biodegradable polyester resin based on the total amount of the biodegradable polyester resin. The branching agent may be included in a content ranging from about 0.1 wt % to about 3 wt % in the biodegradable polyester resin based on the total amount of the biodegradable polyester resin. The branching agent may be included in a content ranging from about 0.1 wt % to about 1 wt % in the biodegradable polyester resin based on the total amount of the biodegradable polyester resin.

Since the biodegradable polyester resin includes the branching agent within the above-noted ranges, the biodegradable polyester resin composition (according to one embodiment) may have appropriate mechanical characteristics and appropriate biodegradability.

The biodegradable polyester resin composition according to yet another embodiment may include the biodegradable resin in a content ranging from about 30 wt % or more based on the total weight of the composition. The biodegradable polyester resin composition according to still another embodiment may include the biodegradable resin in a content ranging from about 50 wt % or more based on the total weight of the composition. The biodegradable polyester resin composition according to a further embodiment may include the biodegradable resin in a content ranging from about 70 wt % or more based on the total weight of the composition. The biodegradable polyester resin composition according to a still further embodiment may include the biodegradable resin in a content ranging from about 80 wt % or more based on the total weight of the composition. The biodegradable polyester resin composition according to one embodiment may include the biodegradable resin in a content ranging from about 90 wt % or more based on the total weight of the composition. The biodegradable polyester resin composition according to another embodiment may include the biodegradable resin in a content ranging from about 95 wt % or more based on the total weight of the composition. The biodegradable polyester resin composition according to yet another embodiment may include the biodegradable resin in a content ranging from about 99 wt % or more based on the total weight of the composition. A maximum content of the biodegradable resin in the biodegradable polyester resin composition according to still another embodiment may be about 100 wt % based on the total weight of the composition.

The biodegradable polyester resin composition according to one embodiment may further include a reinforcing material. The reinforcing material may improve the mechanical properties of the biodegradable polyester resin composition according to another embodiment and the mechanical properties of a film or molded article made of the composition. In addition, the reinforcing material may control the deformation characteristics of the biodegradable polyester resin composition according to yet another embodiment due to ultraviolet rays. In addition, the reinforcing material may control the hydrolysis characteristics of the biodegradable polyester resin composition according to another embodiment. In addition, the reinforcing material may control the biodegradability of the biodegradable polyester resin according to a further embodiment.

The reinforcing material may be a fiber derived from biomass. The reinforcing material may be a fiber made of an organic material. The reinforcing material may be nanocellulose.

The nanocellulose may be one or more selected from the group consisting of nanocrystalline cellulose, cellulose nanofiber, microfibrillated cellulose, hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose and cyclohexyl cellulose.

The nanocellulose may include an ion-bonded metal. The nanocrystalline cellulose may include elemental sodium. In addition, the nanocrystalline cellulose may include sulphate. The nanocrystalline cellulose may include a carboxylate. The nanocrystalline cellulose may include a cellulose hydrogen sulphate sodium salt (Cellulose hydrogen sulphate sodium salt).

The nanocellulose may be represented by Formula 13 below:

$$[(C_6H_{10}O_5)_xSO_3Na]_y \qquad \text{[Formula 13]}$$

where x is 1 to 35, and y is 1 to 10. x may be 15 to 35, and y may be 1 to 10.

The specific surface area of the nanocellulose may range from about 200 m$^2$/g to about 600 m$^2$/g. The specific surface area of the nanocellulose may range from about 250 m$^2$/g to about 500 m$^2$/g.

The weight average molecular weight of the nanocellulose may range from about 10000 g/mol to about 40000 g/mol. The weight average molecular weight of the nanocrystalline cellulose may range from about 11000 g/mol to about 35000 g/mol.

The moisture content of the nanocrystalline cellulose may range from about 2 wt % to about 8 wt %. The moisture content of the nanocrystalline cellulose may range from about 4 wt % to about 6 wt %.

The average diameter of the nanocellulose may range from about 0.5 nm to about 10 nm. The average diameter of the nanocellulose may range from about 1 nm to about 8 nm. The average diameter of the nanocellulose may range from about 1.5 nm to about 7 nm.

The average length of the nanocellulose may range from about 20 nm to about 300 nm. The average length of the nanocellulose may range from about 30 nm to about 180 nm. The average length of the nanocellulose may range from about 35 nm to about 150 nm.

When the diameter and length of the nanocellulose satisfy the above-noted ranges, the biodegradability and properties of the biodegradable polyester resin or the biodegradability and properties of a biodegradable polyester sheet, film and molded article made using the biodegradable polyester resin may be further improved. See tables and examples herein.

The diameter and length of the nanocellulose may be measured by atomic force microscopy in a water-dispersed state.

The sulfur content of the nanocellulose may range from about 0.1 wt % to about 1.2 wt % based on the total amount of the nanocrystalline cellulose. The sulfur content of the nanocellulose may range from about 0.2 wt % to about 1.1 wt % based on the total amount of the nanocellulose.

The pH of the nanocellulose may range from 5 to 8. The pH of the nanocellulose may range from 6 to 8.

The zeta potential of the nanocellulose may range from about −25 mV to about −50 mV. The zeta potential of the nanocellulose may range from about −30 mV to about −45 mV.

The nanocellulose may be included in a content ranging from about 0.01 parts by weight to about 2 parts by weight in the biodegradable polyester resin composition (according to one embodiment) based on 100 parts by weight of the biodegradable polyester resin. The nanocellulose may be included in a content ranging from about 0.03 parts by weight to about 1.5 parts by weight in the biodegradable polyester resin composition (according to another embodiment) based on 100 parts by weight of the biodegradable polyester resin. The nanocellulose may be included in a content ranging from about 0.04 parts by weight to about 1.2 parts by weight in the biodegradable polyester resin composition (according to still another embodiment) based on 100 parts by weight of the biodegradable polyester resin. The nanocellulose may be included in a content ranging from about 0.05 parts by weight to about 1 part by weight in the biodegradable polyester resin composition (according to yet another embodiment) based on 100 parts by weight of the biodegradable polyester resin.

Since the nanocellulose has the characteristics, it may be uniformly dispersed in the biodegradable polyester resin composition according to one embodiment.

Since the nanocellulose has the characteristics, it may improve the mechanical properties of the biodegradable polyester resin composition according to another embodiment.

In addition, the nanocellulose severs as a nucleating agent, thereby being capable of improving the crystallization rate of the biodegradable polyester resin composition according to still another embodiment. Accordingly, the nanocellulose may increase the crystallization temperature of the biodegradable polyester resin composition according to yet another embodiment.

Since the nanocellulose has the characteristics, the biodegradable polyester resin composition (according to one embodiment) may have appropriate UV resistance.

Since the nanocellulose has the characteristics, the biodegradable polyester resin composition (according to another embodiment) may have an appropriate biodegradation rate.

Since the nanocellulose has the characteristics, the biodegradable polyester resin composition (according to still another embodiment) may have an appropriate hydrolysis rate.

The biodegradable polyester resin composition (according to one embodiment) may include a metal salt.

The metal salt may be included in a content ranging from about 0.1 ppm to about 1000 ppm based on the total weight of the biodegradable polyester resin composition according to another embodiment. The metal salt may be included in a content ranging from about 1 ppm to about 500 ppm based on the total weight of the biodegradable polyester resin composition according to yet another embodiment. The metal salt may be included in a content ranging from about 1 ppm to about 100 ppm based on the total weight of the biodegradable polyester resin composition according to still another embodiment. The metal salt may be included in a content ranging from about 1 ppm to about 50 ppm based on the total weight of the biodegradable polyester resin composition according to a further embodiment.

The metal salt may be at least one or more selected from the group consisting of a nitrate, a sulfate, hydrochloride, a carboxylate and the like. The metal salt may be at least one or more selected from the group consisting of titanium salt, silicon salt, sodium salt, calcium salt, potassium salt, magnesium salt, copper salt, iron salt, aluminum salt, silver salt and the like. The metal salt may be at least one or more selected from the group consisting of magnesium acetate, calcium acetate, potassium acetate, copper nitrate, silver nitrate, sodium nitrate, and the like.

The metal salt may include one or more selected from the group consisting of iron (Fe), magnesium (Mg), nickel (Ni), cobalt (Co), copper (Cu), palladium (Pd), zinc (Zn), vanadium (V), titanium, (Ti), indium (In), manganese (Mn), silicon (Si) and tin (Sn).

In addition, the metal salt may be one or more selected from the group consisting of acetate, nitrate, nitride, sulfide, sulfate, sulfoxide, hydroxide, hydrate, chloride, chlorinate and bromide.

Since the biodegradable polyester resin composition according to one embodiment includes the metal salt within the content noted above for the metal salt, a hydrolysis rate and a biodegradation rate may be appropriately controlled.

The biodegradable polyester resin composition according to one embodiment may further include an anti-hydrolysis agent.

The anti-hydrolysis agent may be at least one or more selected from among silicone-based compounds such as silane, silazane and siloxane.

The anti-hydrolysis agent may include alkoxy silane. The anti-hydrolysis agent may include trimethoxy silane and/or triethoxy silane. The anti-hydrolysis agent may include alkoxy silane including an epoxy group. The anti-hydrolysis agent may include at least one or more selected from the group consisting of 2-(3,4-epoxycyclohexyl)ethyltrimethoxysilane, 3-glycidoxypropyl methyldimethoxysilane, 3-glycidoxypropyl trimethoxysilane, 3-glycidoxypropyl methyldiethoxysilane and 3-glycidoxypropyl triethoxysilane.

The anti-hydrolysis agent may be included in a content ranging from about 1 ppm to about 10000 ppm in the biodegradable polyester resin composition according to one embodiment. The anti-hydrolysis agent may be included in a content ranging from about 1 ppm to about 1000 ppm in the biodegradable polyester resin composition according to another embodiment. The anti-hydrolysis agent may be included in a content ranging from about 5 ppm to 500 ppm in the biodegradable polyester resin composition according to still another embodiment. The anti-hydrolysis agent may be included in a content ranging from about 10 ppm to 300 ppm in the biodegradable polyester resin composition according to yet another embodiment.

The anti-hydrolysis agent may be bonded to the biodegradable polyester resin. The anti-hydrolysis agent may be chemically bonded to the biodegradable polyester resin. The anti-hydrolysis agent may be chemically bonded to a polymer included in the biodegradable polyester resin. The anti-hydrolysis agent may couple polymers included in the biodegradable polyester resin.

Since the biodegradable polyester resin composition according to one embodiment includes the anti-hydrolysis agent within the ranges noted above, it may have appropriate hydrolysis resistance. In particular, since the biodegradable polyester resin according to one embodiment includes the anti-hydrolysis agent within the range, it may have appropriate initial hydrolysis characteristics and improved biodegradability.

Accordingly, the biodegradable polyester resin composition according to one embodiment may include a silicon element. The biodegradable polyester resin composition according to this embodiment may include the silicon element in a content ranging from about 1 ppm to about 150 ppm. The biodegradable polyester resin composition according to another embodiment may include the silicon element in a content ranging from about 0.1 ppm to about 100 ppm.

The biodegradable polyester resin composition according to still another embodiment may include the silicon element in a content ranging from about 0.1 ppm to about 50 ppm. The biodegradable polyester resin composition according to yet another embodiment may include the silicon element in a content of about 0.1 ppm to about 20 ppm.

In addition, the anti-hydrolysis agent may also react with a terminal carboxyl group or an unreacted carboxyl group. Accordingly, the biodegradable polyester resin composition according to one embodiment may have a low acid value.

In addition, the anti-hydrolysis agent may couple polymers included in the biodegradable polyester resin, so that the biodegradable polyester resin composition according to one embodiment may increase the ratio of high-molecular-weight polymers.

Accordingly, the mechanical properties of the biodegradable polyester resin composition (according to another embodiment) may be improved.

The biodegradable polyester resin composition according to one embodiment may further include a chain extender.

The chain extender may include isocyanate.

The chain extender may be at least one or more selected from the group consisting of monofunctional isocyanate or polyfunctional isocyanate.

The chain extender may be at least one or more selected from the group consisting of tolylene 2,4-diisocyanate, tolylene 2,6-diisocyanate, diphenylmethane 4,4'-diisocyanate and 2,4'-diisocyanate, naphthalene 1,5-diisocyanate, xylylene diisocyanate, hexamethylene diisocyanate, pentamethylene diisocyanate, isophorone diisocyanate and methylenebis(4-isocyanatocyclohexane).

The chain extender may include triisocyanate. The chain extender may include tri(4-isocyanatophenyl)methane.

The chain extender may include an acrylic polymer. The acrylic polymer may include an acryl group. The acryl group may be bonded to a main chain as a side chain. The acrylic polymer may include an epoxy group. The epoxy group may be bonded to the main chain as a side chain.

The chain extender may include a styrene-based polymer. The chain extender may include a styrene-based glycidyl acrylate.

The chain extender may be chemically bonded to the biodegradable polyester resin. The chain extender may be chemically bonded to a polymer included in the biodegradable polyester resin. The chain extender may be bonded to a terminal of the polymer included in the biodegradable polyester resin. In addition, the chain extender may be bonded to terminals of three polymers included in the biodegradable polyester resin.

The chain extender may be included in the biodegradable polyester resin composition (according to one embodiment) in a content ranging from about 0.1 wt % to about 10 wt % based on the total amount of the composition. The chain extender may be included in the biodegradable polyester resin composition (according to another embodiment) in a content ranging from about 0.2 wt % to about 8 wt % based on the total amount of the composition. The chain extender may be included in the biodegradable polyester resin composition (according to still another embodiment) in a content ranging from about 0.3 wt % to about 7 wt % based on the total amount of the composition.

When the biodegradable polyester resin composition according to one embodiment includes the chain extender within the ranges noted above, it may have appropriate hydrolysis resistance and appropriate biodegradability.

In addition, the chain extender may react with a terminal carboxyl group or an unreacted carboxyl group. Accordingly, the biodegradable polyester resin composition according to one embodiment may have a low acid value.

In addition, the chain extender couples polymers included in the biodegradable polyester resin, so that the biodegradable polyester resin composition (according to one embodiment) may increase the ratio of high-molecular-weight polymers. Accordingly, the mechanical properties of the biodegradable polyester resin composition (according to this embodiment) may be improved.

The biodegradable polyester resin composition according to one embodiment may include an oligomer. The molecular weight of the oligomer may range from about 400 to about 1300.

The oligomer may be included in the biodegradable polyester resin composition (according to another embodiment) in a content ranging from about 3000 ppm to about 30000 ppm based on the total amount of the resin composition. The oligomer may be included in the biodegradable polyester resin composition (according to still another embodiment) in a content ranging from about 5000 ppm to about 20000 ppm based on the total amount of the resin composition. The oligomer may be included in the biodegradable polyester resin composition (according to yet another embodiment) in a content ranging from about 5000 ppm to about 15000 ppm based on the total amount of the resin composition. The oligomer may be included in the biodegradable polyester resin composition (according to a further embodiment) in a content ranging from about 7000 ppm to about 15000 ppm based on the total amount of the resin composition.

The oligomer may be a reaction product of at least two or more of the diol, the aromatic dicarboxylic acid and the aliphatic dicarboxylic acid. The oligomer may be a reaction product of 1,4-butanediol, terephthalic acid and adipic acid.

The oligomer may include an oligomer in which a molar ratio of the aliphatic dicarboxylic acid is higher than that of the aromatic dicarboxylic acid. In the oligomer, a ratio of an oligomer containing a relatively large amount of the aliphatic dicarboxylic acid may be higher than a ratio of an oligomer containing a relatively large amount of the aromatic dicarboxylic acid.

The oligomer may appropriately control the hydrolysis degree of the biodegradable polyester resin composition according to one embodiment. The oligomer may be a hydrolysis regulator that appropriately controls the hydrolysis degree of the biodegradable polyester resin composition according to another embodiment.

In addition, the oligomer may appropriately control the biodegradability of the biodegradable polyester resin composition according to another embodiment. The oligomer may be a biodegradation regulator that appropriately controls the biodegradability of the biodegradable polyester resin composition according to still another embodiment.

The biodegradable polyester resin composition according to one embodiment may include a heat stabilizer. The heat stabilizer may be a phosphorus-based heat stabilizer.

The heat stabilizer may be at least one or more selected from the group consisting of an amine-based high-temperature heat stabilizer such as tetraethylenepentamine, triethylphosphonoacetate, phosphoric acid, phosphorous acid, polyphosphoric acid, trimethyl phosphate (TMP), triethyl phosphate, trimethyl phosphine, triphenyl phosphine and the like.

In addition, the heat stabilizer may be an antioxidant having an antioxidant function.

The content of the heat stabilizer may range from about 3000 ppm or less based on the total weight of the biodegradable polyester resin. The content of the heat stabilizer may range from, for example, 10 ppm to 3,000 ppm, 20 ppm to 2,000 ppm, 20 ppm to 1,500 ppm or 20 ppm to 1,000 ppm based on the total weight of the biodegradable polyester resin. When the content of the heat stabilizer satisfies the ranges noted above, the deterioration of the polymer due to high temperature during the reaction process may be controlled so that terminal groups of the polymer may be reduced and the color may be improved. In addition, the heat stabilizer may suppress the activation of a titanium-based catalyst, thereby controlling a reaction rate.

The biodegradable polyester resin composition according to one embodiment may include an elongation improver. Examples of the elongation improver include oil such as paraffin oil, naphthenic oil, or aromatic oil, or adipate such as dibutyl adipate, diethylhexyl adipate, dioctyl adipate, or diisopropyl adipate.

The elongation improver may be included in the biodegradable polyester resin composition (according to another embodiment) in a content ranging from about 0.001 parts by weight to about 1 part by weight based on 100 parts by weight of the biodegradable polyester resin. The elongation improver may be included in a content ranging from about 0.01 parts by weight to about 1 part by weight based on 100 parts by weight of the biodegradable polyester resin in the biodegradable polyester resin composition according to still another embodiment.

The biodegradable polyester resin composition according to one embodiment may include an inorganic filler. The inorganic filler may be at least one or more selected from the group consisting of calcium sulfate, barium sulfate, talc, talc powder, bentonite, kaolinite, chalk powder, calcium carbonate, graphite, gypsum, electrically conductive carbon black, calcium chloride, iron oxide, aluminum oxide, potassium oxide, dolomite, silicon dioxide, wollastonite, titanium dioxide, silicate, mica, glass fiber, mineral fiber, and the like.

In a particle diameter distribution obtained by laser diffraction for the inorganic filler, a cumulative 50% particle size ($D_{50}$) based on volume may range from about 100 μm or less, about 85 μm or less, about 70 μm or less, about 50 μm or less, about 25 μm or less, about 10 μm or less, about 5 μm or less, about 3 μm or less or about 1 μm or less.

In addition, the specific surface area of the inorganic filler may range from about 100 $m^2/g$ or more. For example, the specific surface area of the inorganic filler may range from about 100 $m^2/g$ or more, about 105 $m^2/g$ or more or about 110 $m^2/g$ or more.

The inorganic filler may be included in the biodegradable polyester resin composition (according to one embodiment) in a content ranging from about 3 parts by weight to about 50 parts by weight based on 100 parts by weight of the biodegradable polyester resin. The inorganic filler may be included in the biodegradable polyester resin composition (according to another embodiment) in a content ranging from about 5 parts by weight to about 30 parts by weight based on 100 parts by weight of the biodegradable polyester resin.

The inorganic filler may be included in a content ranging from about 3,000 ppm or less based on the total weight of the biodegradable polyester resin composition according to still another embodiment. For example, the content of the inorganic filler may range from about 3,000 ppm or less, about 1,500 ppm or less, about 1,200 ppm or less, about 800 ppm or less or about 600 ppm or less, particularly about 50 ppm or more, about 100 ppm or more, about 130 ppm or more, about 150 ppm or more or about 180 ppm or more based on the total weight of the biodegradable polyester resin composition according to yet another embodiment.

Since the biodegradable polyester resin composition according to the above described embodiment includes the inorganic filler within the ranges noted above, the biodegradable polyester resin composition (according to one embodiment) may have appropriate mechanical properties, an appropriate UV resistance, an appropriate biodegradation rate and an appropriate hydrolysis rate. See tables and examples herein.

The biodegradable polyester resin composition according to one embodiment may further include a heterogeneous biodegradable resin. The biodegradable polyester resin composition according to one example may be a composite resin composition including two or more types of resins, a filler and an additive.

The heterogeneous biodegradable resin may be at least one or more selected from the group consisting of polybutylene azelate terephthalate (PBAzT), polybutylene sebacate terephthalate (PBSeT) and polybutylene succinate terephthalate (PBST), polyhydroxyalkanoate (PHA) or polylactic acid (PLA).

The heterogeneous biodegradable resin may be included in the biodegradable polyester resin composition (according to one embodiment) in a content ranging from about 10 parts by weight to about 100 parts by weight based on 100 parts by weight of the biodegradable polyester resin. The heterogeneous biodegradable resin may be included in the biodegradable polyester resin composition (according to another embodiment) in a content ranging from about 10 parts by weight to about 60 parts by weight based on 100 parts by weight of the biodegradable polyester resin. The heterogeneous biodegradable resin may be included in the biodegradable polyester resin composition (according to still another embodiment) in a content ranging from about 20 parts by weight to about 50 parts by weight based on 100 parts by weight of the biodegradable polyester resin.

The heterogeneous biodegradable resin may supplement the mechanical, optical and chemical properties of the biodegradable polyester resin. Since the biodegradable polyester resin composition according to this embodiment includes the heterogeneous biodegradable resin in the content, the biodegradable polyester resin composition according to one embodiment may have appropriate mechanical properties, appropriate UV resistance, an appropriate biodegradation rate and an appropriate hydrolysis rate.

In addition, the amount of carboxyl terminal groups of the biodegradable polyester resin composition according to one embodiment may range from about 50 eq/ton or less. For example, the number of the carboxyl terminal groups of the biodegradable polyester resin according to an embodiment may range from about 50 eq/ton or less, about 48 eq/ton or less, about eq/ton or less or about 42 eq/ton or less. When the number of the carboxyl terminal groups is adjusted to the range, deterioration may be prevented and improved mechanical properties may be implemented when the biodegradable polyester resin composition according to an embodiment is extruded to form a molded article.

In addition, the intrinsic viscosity (IV) of the biodegradable polyester resin composition according to one embodiment may range from about 0.9 dl/g or more. The intrinsic viscosity of the biodegradable polyester resin composition according to one embodiment may range from about 0.95 dl/g or more, about 1.0 dl/g or more, about 1.1 dl/g or more, about 1.2 dl/g or more or about 1.3 dl/g or more. The intrinsic viscosity of the biodegradable polyester resin composition according to another embodiment may range from about 0.95 dl/g to about 1.7 dl/g. The intrinsic viscosity of the biodegradable polyester resin composition according to still another embodiment may range from about 1.3 dl/g to about 1.7 dl/g. The intrinsic viscosity of the biodegradable polyester resin composition according to yet another embodiment may range from about 1.4 dl/g to about 1.7 dl/g.

A process of preparing the biodegradable polyester resin composition according to one embodiment is as follows.

Referring to FIG. 1, an apparatus for producing the biodegradable polyester resin includes a slurry stirrer 100, an esterification part 200, a polycondensation reaction part 300, a post-treatment part 400, a first recovery part 510 and a second recovery part 520.

A method of preparing the biodegradable polyester resin includes a step of preparing a slurry including the diol and the aromatic dicarboxylic acid.

The step of preparing a slurry includes a step of mixing and processing the diol and the aromatic dicarboxylic acid. That is, the step of preparing a slurry is a pretreatment step before an esterification and may be a step of mixing the diol and the aromatic dicarboxylic acid and slurrying the mixture. Here, the diol may include a biomass-based diol component.

The temperature of the slurry of the diol and the aromatic dicarboxylic acid may be about 5° C. to about 15° C. higher than the melting point of the diol. For example, when the diol is 1,4-butanediol, the temperature of the slurry may be about 35° C. to about 45° C.

The diol and the aromatic dicarboxylic acid are fed into and stirred in the slurry stirrer 100, thereby preparing the slurry.

By mixing, pre-treating, and slurrying the diol and the aromatic dicarboxylic acid, the diol and the aromatic dicarboxylic acid may be uniformly reacted, and the speed of an esterification may be effectively accelerated, thereby increasing reaction efficiency.

In particular, when an aromatic dicarboxylic acid, such as terephthalic acid, has complete crystallinity and is in powder form, it may be difficult to cause a homogeneous reaction due to very low solubility in the diol. Therefore, the slurrying pretreatment process may provide a biodegradable polyester resin, sheet, film and molded article having excellent properties (according to one embodiment of the present disclosure) and may assist in improving reaction efficiency.

When the aromatic dicarboxylic acid is terephthalic acid, the terephthalic acid is a white crystal that has complete crystallinity and sublimes at around 300° C. under atmospheric pressure without a melting point. In addition, the terephthalic acid has very low solubility in the diol, making it difficult for a homogeneous reaction to occur. Accordingly, when a pretreatment process is performed before an esterification, a uniform reaction may be induced by increasing the surface area for reacting with a diol in a solid matrix of terephthalic acid.

In addition, when the aromatic dicarboxylic acid is dimethyl terephthalate, the dimethyl terephthalate may be made into a molten state at about 142° C. to 170° C. by the pretreatment process and reacted with the diol, so that an esterification can be proceeded faster and more efficiently.

Meanwhile, in the pretreatment step of preparing the slurry, the structure and properties of the biodegradable polyester resin may vary depending on the particle size, particle size distribution, pretreatment reaction conditions, and the like of the aromatic dicarboxylic acid.

For example, the aromatic dicarboxylic acid may include terephthalic acid, and the terephthalic acid may have an average particle diameter (D50) of 10 μm to 400 μm measured by a particle size analyzer Microtrac S3500 in a particle size distribution (PSD), and a standard deviation of the average particle diameter (D50) may be 100 or less. The standard deviation means the square root of the variance. The average particle diameter (D50) of the terephthalic acid may range from for example 20 μm to 200 μm, for example 30 μm to 180 μm, or for example 100 μm to 160 μm. When the average particle diameter (D50) of the terephthalic acid satisfies this range, it may be more advantageous in terms of the solubility improvement of the diol and the reaction rate.

In the pretreatment process, the diol and the aromatic dicarboxylic acid may be mixed and fed into the slurry stirrer 100 (tank).

The slurry stirrer 100 may be provided with, for example, an anchor-type bottom, a height to the agitator of 20 mm or more, and two or more rotary blades, which may be more advantageous to achieve an efficient stirring effect.

For example, the slurry stirrer 100 has a height of 20 mm or more to the agitator, i.e., the reactor and the bottom of the agitator may be almost attached to each other. In this case, a slurry may be obtained without precipitation. If the shape, shape and rotary blades of the agitator do not satisfy the conditions, the aromatic dicarboxylic acid may precipitate to the bottom when the diol and the aromatic dicarboxylic acid are initially mixed. In this case, phase separation may occur.

The pretreatment step of preparing the slurry may include a step of mixing the diol and the aromatic dicarboxylic acid and stirring the mixture at about 50 rpm to about 200 rpm, at about 30° C. to about 100° C. for 10 minutes or more, for example 10 minutes to 200 minutes.

The diol processing may have characteristics as described above.

The diol may be added at one time or dividedly. For example, the diol may be added dividedly when mixing with an aromatic dicarboxylic acid and when mixing with an aliphatic dicarboxylic acid.

The aromatic dicarboxylic acid processing may have characteristics as described above.

In the pretreatment step of preparing the slurry, a molar ratio of the diol to the aromatic dicarboxylic acid may range from about 0.8:1 to about 2:1. In the pretreatment step of preparing the slurry, a molar ratio of the diol to the aromatic dicarboxylic acid may range from about 1.1:1 to about 1.5:1. In the pretreatment step of preparing the slurry, a molar ratio of the diol to the aromatic dicarboxylic acid may range from about 1.2:1 to about 1.5:1.

When the diol is added in a larger amount than the aromatic dicarboxylic acid, the aromatic dicarboxylic acid may be dispersed.

In addition, an additive may be added to the slurry. The nanocellulose and/or the metal salt may be added in the form of a dispersion or solution to the slurry.

In the method of preparing the biodegradable polyester resin, a prepolymer is obtained by esterification using a slurry obtained by mixing and pretreating a diol and an aromatic dicarboxylic acid, and the prepolymer is condensation-polymerized, so that the desired structure and physical properties of the biodegradable polyester resin according to one embodiment of the present disclosure may be more efficiently achieved (as detailed below).

The method of preparing the biodegradable polyester resin includes a step of esterifying the slurry and the aliphatic dicarboxylic acid to prepare a prepolymer. The slurry and the aliphatic dicarboxylic acid may be reacted in the ester reaction part.

In the esterification, the reaction time may be shortened by using the slurry. For example, a slurry obtained from the pretreatment step may shorten the reaction time of the esterification by 1.5 times or more.

The esterification may be performed at least twice. A prepolymer to be added to a condensation polymerization process may be formed by the esterification.

In one embodiment, the esterification may be performed at once after adding an aliphatic dicarboxylic acid, or a diol and an aliphatic dicarboxylic acid to the slurry. That is, the esterification may proceed when the slurry is fed into the esterification reactor and the aliphatic dicarboxylic acid alone or the aliphatic dicarboxylic acid and the diol are fed into the esterification reactor.

The diol and the aliphatic dicarboxylic acid may be added in the form of a slurry to a slurry including the aromatic dicarboxylic acid.

In the slurry of the diol and the aliphatic dicarboxylic acid, the average particle diameter (D50) of the aliphatic dicarboxylic acid may range from about 50 μm to about 150 μm. In the slurry of the diol and the aliphatic dicarboxylic acid, the average particle diameter (D50) of the aliphatic dicarboxylic acid may range from about 60 μm to about 120 μm.

In the esterification, the total number of moles of the diols introduced may be about 1.0 to about 1.8 relative to the total number of moles of the aromatic dicarboxylic acid and the aliphatic dicarboxylic acid. In the esterification, the total number of moles of the diols introduced may range from about 1.1 to about 1.6 relative to the total number of moles of the aromatic dicarboxylic acid and the aliphatic dicarboxylic acid.

In addition, the temperature of the slurry of the diol and the aliphatic dicarboxylic acid may range from about 5° C. to about 15° C. higher than the melting point of the diol.

In addition, various additives such as the nanocellulose may also be added to the slurry of the diol and the aliphatic dicarboxylic acid.

The esterification may be performed at about 250° C. or less for about 0.5 hours to about hours. Specifically, the esterification may be performed at about 180° C. to about 250° C., about 185° C. to about 240° C. or about 200° C. to about 240° C. under normal pressure or reduced pressure until for example the theoretical amount of water as a by-product reaches 95%. For example, the esterification may be performed for 0.5 hours to 5.5 hours, 0.5 hours to 4.5 hours or 1 hour to 4 hours, but the present disclosure is not limited thereto.

In one embodiment, the slurry, the aliphatic dicarboxylic acid and the diol may be mixed, and a first esterification may be performed. In the reaction mixture for the first esterification, a molar ratio of an aromatic dicarboxylic acid to the aliphatic dicarboxylic acid may range from 1:0.05 to 1:0.5.

In addition, after the first esterification, the mixture of the slurry, the aliphatic dicarboxylic acid and the diol is fed into the esterification part and may undergo a second esterification together with the first esterification product. In the mixture fed into the second esterification, a molar ratio of the aromatic dicarboxylic acid to the aliphatic dicarboxylic acid may range from 0.05:1 to 0.5:1.

The first esterification may be performed at 250° C. or less for 1.25 hours to 4 hours. Specifically, the first esterification may be performed at 180° C. to 250° C., 185° C. to 240° C. or 200° C. to 240° C. under normal pressure or reduced pressure until for example the theoretical amount of water as a by-product reaches 95%. For example, the first esterification may be performed for 1.25 hours to 4 hours, 1.25 hours to 3.5 hours or 2.5 hours to 3 hours, but the present disclosure is not limited thereto.

The second esterification may be performed for 0.25 hours to 3.5 hours at about 250° C. or less. Specifically, the second esterification may be performed at 180° C. to 250° C., 185° C. to 240° C. or 200° C. to 240° C. under normal pressure or reduced pressure until for example the theoretical amount of water as a by-product reaches 95%. For example, the second esterification may be performed for 0.5 hours to 3 hours, 1 hour to 2.5 hours or 1.5 hours to 2.5 hours, but the present disclosure is not limited thereto.

In the first esterification and the second esterification, the number ratio, the alternating ratio, the hard segment ratio, the soft segment ratio, and the like of the first block and the second block may be controlled by adjusting the reaction temperature, the reaction time, and the contents of diol, aromatic dicarboxylic acid, and aliphatic dicarboxylic acid added, respectively. In addition, when the esterification is divided into the first esterification and the second esterification, the overall esterification may be more precisely controlled. Accordingly, when the esterification is divisionally performed, the reaction stability and reaction uniformity of the esterification may be improved.

In addition, in the second esterification, a branching agent (as noted above) may be additionally added. That is, the prepolymer may be formed by reacting the mixture of the slurry, the aliphatic dicarboxylic acid and the diol, the branching agent and the first esterification product. The characteristics and content of the branching agent may be the same as described above.

After completing the second esterification, a third esterification may be performed. Here, a monomer composition including at least one of the diol, the aromatic dicarboxylic acid and the aliphatic dicarboxylic acid may be added to the second esterification product, and the third esterification may be performed.

The monomer composition may be added to the second esterification product in a content ranging from about 0.5 parts by weight to about 10 parts by weight based on 100 parts by weight of the second esterification product.

In addition, in the monomer composition, a molar ratio of the aromatic dicarboxylic acid to the aliphatic dicarboxylic acid may range from about 1:1 to about 1:3. In the monomer composition, a molar ratio of the aromatic dicarboxylic acid to the aliphatic dicarboxylic acid may range from about 1:1.3 to about 1:3.

In addition, in the monomer composition, a molar ratio of the diol to all the dicarboxylic acids may range from about 0.8:1 to 1:1.2.

The third esterification may be performed at about 250° C. or less for 0.1 hours to 0.5 hours. Specifically, the third esterification may be performed at 180° C. to 250° C., 185° C. to 240° C. or 200° C. to 240° C. under normal pressure or reduced pressure. For example, the third esterification may be performed for 5 minutes to 60 minutes, 10 minutes to 50 minutes or 10 minutes to 40 minutes, but the present disclosure is not limited thereto.

By the third esterification, a prepolymer may be formed.

When using the monomer composition and performing the third esterificationunder the above-described conditions, the alternating ratio, the hard segment ratio and the soft segment ratio may be appropriately controlled.

In one embodiment for the third esterification, the second esterification product may not be initially used. That is, the third esterification may be performed by the monomer composition and other additives such as a catalyst. Next, the second esterification product and the third esterification product are mixed to produce the prepolymer. Here, the third esterification product may be mixed with the second esterification product in a content of about 0.1 parts by weight to about 5 parts by weight based on 100 parts by weight of the second esterification product, thereby producing the prepolymer.

The number average molecular weight of the prepolymer may range from about 500 to about 10000 g/mol. For example, the number average molecular weight of the prepolymer may range from about 500 to about 8500 g/mol, about 500 to about 8000 g/mol, about 500 to about 7000 g/mol, about 500 g/mol to about 5000 g/mol, or about 800 g/mol to about 4000 g/mol. When the number average molecular weight of the prepolymer satisfies the ranges above, the molecular weight of a polymer in a polycondensation reaction may be efficiently increased.

The number average molecular weight may be measured using gel permeation chromatography (GPC). Specifically, data obtained by gel permeation chromatography includes various items such as Mn, Mw and Mp. Thereamong, the molecular weight may be measured based on the number average molecular weight (Mn).

The reinforcing material and/or the metal salt may be added together with the slurry before the esterification. The reinforcing material and/or the metal salt may be fed into the esterification part 200 in the middle of the esterification. The reinforcing material and/or the metal salt may be fed into the esterification product after the esterification. In addition, the reinforcing material and/or the metal salt may be added together with the aliphatic dicarboxylic acid. In addition, the reinforcing material and/or the metal salt may be fed into the esterification part 200 after the first esterification and before the second esterification.

Since the reinforcing material and/or the metal salt is added during the esterification, the reinforcing material and/or the metal salt may be uniformly dispersed in the biodegradable polyester resin.

The reinforcing material may have the above-described characteristics. In particular, the nanocellulose may be used as the reinforcing material.

The nanocellulose may be pre-treated by a bead mill, pre-treated by ultrasonic waves, or pre-treated by high-speed dispersion at about 1000 rpm to about 1500 rpm before being introduced. Specifically, the nano-cellulose may be water-dispersed nano-cellulose pre-treated with a bead mill or pre-treated with ultrasonic waves.

First, the bead mill pretreatment may be performed with a vertical mill or horizontal mill as a wet milling device. In the horizontal mill, the amount of beads that can be filled into a chamber is larger, and the uneven wear of the machine is reduced, the wear of the beads is reduced, and maintenance is easier, but the present disclosure is not limited thereto.

The bead mill pretreatment may be performed using one or more bead types selected from the group consisting of zirconium, zircon, zirconia, quartz and aluminum oxide.

Specifically, the bead mill pretreatment may be performed using beads having a diameter ranging from about 0.3 mm to about 1 mm. For example, the diameter of the beads may range from about 0.3 mm to about 0.9 mm, about 0.4 mm to about 0.8 mm, about 0.45 mm to about 0.7 mm or about 0.45 mm to about 0.6 mm.

When the diameter of the beads satisfies the ranges above, the dispersibility of nanocellulose may be further improved. When the diameter of the beads exceeds the ranges above, the average particle diameter and average particle deviation of nanocellulose increase, resulting in low dispersibility.

In addition, in the bead mill pretreatment, beads can be used with a higher specific gravity than that of nanocellulose. For example, the beads may be one or more selected from the group consisting of zirconium, zircon, zirconia, quartz and aluminum oxide which have a higher specific gravity than water-dispersed nanocellulose, and zirconium beads having a specific gravity four times or higher than the water-dispersed nanocellulose can be used, but the present disclosure is not limited thereto.

In addition, the ultrasonic pretreatment represents one method of physically pulverizing or separating nanoparticles with waves generated for example by emitting 20 kHz ultrasound beam into a solution containing the nanoparticles.

The ultrasonic pretreatment may be performed for less than 30 minutes at an output of 30000 J/s or less. For example, the ultrasonic pretreatment may be performed at an output of 25000 J/s or less or 22000 J/s or less for 25 minutes or less, 20 minutes or less or 18 minutes or less. When the output and the execution time satisfy the above ranges, the effect, i.e., the improvement of dispersibility, of the ultrasonic pretreatment may be maximized. When the output exceeds the above ranges, the nanoparticles may rather re-agglomerate, and the dispersibility may be lowered.

The nanocellulose according to one embodiment may be pre-treated with a bead mill or pre-treated with ultrasonic waves. Alternatively, the nanocellulose according to another embodiment may be pre-treated with a bead mill and pre-treated with ultrasonic waves. Here, performing ultrasonic pretreatment after pre-treating with a bead mill can improve dispersibility by preventing re-agglomeration.

The nanocellulose according to another embodiment may be pre-treated with a bead mill or pre-treated with ultrasonic waves. Alternatively, the nanocellulose according to another embodiment may be pre-treated with a bead mill and pre-treated with ultrasonic waves. Here, performing the ultrasonic pretreatment after pretreatment with a bead mill can improve dispersibility by preventing reagglomeration.

Since the nanocellulose typically includes an ion-bonded metal, it has a high dispersibility in water. In addition, an aqueous dispersion having a high dispersion of the nanocellulose may be obtained by the bead mill pretreatment and/or the ultrasonic pretreatment. In the aqueous nanocellulose dispersion, the content of the nanocellulose may be about 1 wt % to about 50 wt %.

In the esterification, a titanium-based catalyst and/or a germanium-based catalyst may be used. Specifically, the titanium-based catalyst and/or the germanium-based catalyst may be added to the slurry, and the esterification may be performed.

In addition, the titanium-based catalyst and/or the germanium-based catalyst may be added to the slurry before the first esterification, and the titanium-based catalyst and/or the germanium-based catalyst may be further added to the product of the first esterification.

The biodegradable polyester resin may include one or more titanium-based catalysts selected from the group consisting of titanium isopropoxide, antimony trioxide, dibutyltin oxide, tetrapropyl titanate, tetrabutyl titanate, tetraisopropyl titanate, antimonia acetate, calcium acetate and magnesium acetate, or one or more germanium-based catalysts selected from the group consisting of germanium oxide, germanium methoxide, germanium ethoxide, tetramethyl germanium, tetraethyl germanium and germanium sulfide.

In addition, the content of the catalyst may range from about 50 ppm to 2000 ppm based on a total weight of a diol, an aromatic dicarboxylic acid, and an aliphatic dicarboxylic acid. For example, ranges from about 60 ppm to about 1600 ppm, about 70 ppm to about 1400 ppm, about 80 ppm to about 1200 ppm or about 100 ppm to about 1100 ppm of titanium-based catalyst or germanium-based catalyst may be included. When the content of the catalyst satisfies the range, the physical properties may be further improved.

In addition, the heat stabilizer may be added together with the slurry before the esterification. The heat stabilizer may be fed into the esterification part 200 in the middle of the esterification. The heat stabilizer may be added to the esterification product after the esterification. In addition, the heat stabilizer may be added together with the aliphatic dicarboxylic acid. In addition, the heat stabilizer may be fed into the esterification part 200 after the first esterification and before the second esterification.

The characteristics of the heat stabilizer may be as described above.

The content of the heat stabilizer may be 3,000 ppm or less based on a total weight of a diol, an aromatic dicarboxylic acid, and an aliphatic dicarboxylic acid. Specifically, the content of the heat stabilizer may range from, for example, 10 ppm to 3,000 ppm, 20 ppm to 2,000 ppm, 20 ppm to 1,500 ppm or 20 ppm to 1,000 ppm based on a total weight of a diol, an aromatic dicarboxylic acid, and an aliphatic dicarboxylic acid. When the content of the heat stabilizer satisfies the range, the deterioration of the polymer due to high temperature during the reaction process may be controlled, the terminal groups of the polymer may be reduced, and the color may be improved.

After completion of the esterification, one or more selected from the group consisting of an additive such as silica, potassium or magnesium and a color-correcting agent such as cobalt acetate may be further added to the esterification product. That is, after completion of the esterification, the additive and/or the color-correcting agent may be added and stabilized, and then a polycondensation reaction may be performed. The additive and/or the color-correcting agent may be added after completion of the esterification, and may be fed into the polycondensation reaction part 300 together with the prepolymer. Accordingly, the additive and/or the color-correcting agent may be uniformly dispersed in the biodegradable polyester resin.

In addition, after completion of the esterification, the inorganic filler may be added to the esterification product. That is, the inorganic filler is added and stabilized after completion of the esterification, and then the polycondensation reaction may be performed. The characteristics of the inorganic filler are as described above. The inorganic filler may be fed into the polycondensation reaction part 300 together with the prepolymer, and the condensation polymerization process may be performed. Accordingly, the inorganic filler may be uniformly dispersed in the biodegradable polyester resin.

In addition, the first recovery part 510 recovers by-products such as water from the esterification part 200. The first recovery part 510 may recover by-products generated from the esterification by applying vacuum pressure to the esterification part 200 or proceeding with reflux.

The method of preparing the biodegradable polyester resin includes a step of polycondensing the prepolymer. The polycondensation reaction may be performed as follows.

The prepolymer is fed into the polycondensation reaction part 300. In addition, at least one of the reinforcing material, the heat stabilizer, the color-correcting agent, the inorganic filler, the metal salt and other additives may be fed into the polycondensation reaction part 300 together with the prepolymer.

Next, the polycondensation reaction may be performed at about 180° C. to about 280° C. and about 10 Torr or less for about 1 hour to about 5 hours. For example, the polycondensation reaction may be performed at about 190° C. to about 270° C., about 210° C. to about 260° C. or about 230° C. to about 255° C. under about 0.9 Torr or less, about 0.7 Torr or less, about 0.2 Torr to about 10 Torr, about 0.2 Torr to about 0.9 Torr or about 0.2 Torr to about 0.6 Torr for about 1.5 hours to about 5 hours, about 2 hours to about 4.5 hours or about 2 hours to about 4 hours.

In addition, the polycondensation reaction may include first polycondensation and second polycondensation.

For example, the first polycondensation may be performed at about 260° C. or less, about 250° C. or less, about 215° C. to about 250° C., about 215° C. to about 245° C. or about 230° C. to about 245° C. under about 1 Torr to about 200 Torr, about 2 Torr to about 100 Torr, about 4 Torr to about 50 Torr, about 5 Torr to about 45 Torr or about 8 Torr to about 32 Torr for about 0.5 hours to about 3.5 hours, about 0.5 hours to about 3.0 hours or about 0.5 hours to about 2.8 hours.

In addition, the second polycondensation may be performed at about 220° C. to about 265° C., about 230° C. to about 260° C. or about 235° C. to about 255° C. under about 1 Torr or less, about 0.8 Torr or less, about 0.6 Torr or less, about 0.1 Torr to about 1 Torr, about 0.2 Torr to about 0.8 Torr or about 0.2 Torr to about 0.6 Torr for about 0.5 hours to about 4 hours, about 1 hour to about 3.5 hours or about 1.5 hours to about 3.5 hours.

In addition, before the polycondensation reaction, a titanium-based catalyst or a germanium-based catalyst may be further added to the prepolymer. In addition, before the polycondensation reaction, one or more selected from the group consisting of an additive such as silica, potassium or magnesium; an amine-based stabilizer such as trimethyl phosphate, triphenyl phosphate, trimethyl phosphine, phosphoric acid, phosphorous acid, or tetraethylenepentamine; and a polymerization catalyst such as antimony trioxide, antimony trioxide or tetrabutyl titanate may be further added to the prepolymer.

The number average molecular weight of the polymer may be about 30000 g/mol or more. For example, the number average molecular weight of the polymer may range from about 33000 g/mol or more, about 35000 g/mol or more or about 40000 g/mol to about 90000 g/mol. When the number average molecular weight of the polymer satisfies the range, physical properties, impact resistance, durability and moldability may be further improved.

In addition, the second recovery part 520 recovers by-products such as water from the polycondensation reaction part 300. The second recovery part 520 may apply vacuum pump to the polycondensation reaction part 300, and may recover by-products generated in the polycondensation reaction.

The second recovery part 520 may apply a vacuum pressure of about 0.1 Torr to about 1 Torr to the inside of the polycondensation reaction part 300. The second recovery part 520 may apply a vacuum pressure of about 0.1 Torr to about 0.9 Torr to the inside of the polycondensation reaction part 300.

Next, the anti-hydrolysis agent and/or the chain extender are added to the polymer. Next, the polymer, the anti-hydrolysis agent and the chain extender are uniformly mixed and allowed to stand at about 200° C. to about 260° C. for about 1 minute to about 15 minutes. Accordingly, the polymer reacts with the anti-hydrolysis agent and/or the chain extender.

Alternatively, the anti-hydrolysis agent and/or the chain extender may be fed into the polycondensation reaction part 300 through a static mixer and reacted with the polymer. A reaction temperature of the anti-hydrolysis agent and/or the chain extender in the polycondensation reaction part 300 may be about 200° C. to about 260° C. In addition, a reaction time of the anti-hydrolysis agent and/or the chain extender in the polycondensation reaction part 300 may be about 1 minute to about 15 minutes.

The chain extender may have the characteristics described above.

The anti-hydrolysis agent may have the characteristics described above.

Accordingly, the biodegradable polyester resin composition according to one embodiment may have appropriate hydrolysis and a high biodegradability degree.

Next, a pellet may be produced from the polymer.

Specifically, the pellet may be produced by cooling the polymer to about 15° C. or less, about 10° C. or less or about 6° C. or less, and then cutting the cooled polymer. Alternatively, the polymer may be cut at about 40° C. to about 60° C.

The cutting step may be performed using any pellet cutting machine used in the art without limitation, and the pellet may have various shapes. The pellet cutting method may include an underwater cutting method or a strand cutting method.

The pellet may be subjected to an additional post-treatment process. The pellet may be fed into the post-treatment part 400, and the post-treatment process may be performed.

The post-treatment process may be performed in the post-treatment part 400. The pellet is fed into the post-treatment part 400. Next, the post-treatment part 400 may melt and re-extrude the fed pellet by frictional heat. That is, the post-treatment part 400 may include an extruder such as a twin-screw extruder.

The temperature of the post-treatment process may range from about 230° C. to about 270° C. The temperature of the post-treatment process may range from about 230° C. to about 260° C. The temperature of the post-treatment process may range from about 240° C. to about 265° C. The temperature of the post-treatment process may range from about 240° C. to about 260° C.

The post-treatment process time may range from about 30 seconds to about 3 minutes. The post-treatment process time may range from about 50 seconds to about 2 minutes. The post-treatment process time may range from about 1 minute to about 2 minutes.

Next, A resin extruded by the extruder may be cooled, cut, and processed into post-treated pellets. That is, the resin extruded from the extruder may be reprocessed into a pellet through the cutting step described above.

Crystallinity of the pellet may be increased in the post-treatment process. In addition, the content of the residue included in the pellet may be adjusted in the post-treatment process. In particular, the content of an oligomer contained in the pellet may be controlled by the post-treatment process. The amount of residual solvent contained in the pellet may be controlled by the post-treatment process.

Accordingly, the post-treatment process may appropriately control the mechanical properties, biodegradability, UV resistance, optical properties, or hydrolysis resistance of the biodegradable polyester resin.

After the pellet is produced, the biodegradable polyester resin may be compounded with the heterogeneous biodegradable resin. In addition, at least one of the inorganic filler, the light stabilizer, the color-correcting agent and the other additives may be compounded with the biodegradable polyester resin and the heterogeneous biodegradable resin.

The compounding process may be as follows.

The biodegradable polyester resin and the heterogeneous biodegradable polyester resin are mixed with at least one of the inorganic filler, the heat stabilizer, the color-correcting agent, the metal salt or the other additives and fed into an extruder. The mixed biodegradable polyester resin composition is melted and mixed at about 120° C. to about 260° C. in the extruder. Next, the melt-mixed biodegradable polyester resin composition is extruded, cooled, cut, and re-pelletized. By this process, the biodegradable polyester resin composition according to one embodiment may be prepared by combining it with the heterogeneous biodegradable polyester resin.

Alternatively, the inorganic filler, the heat stabilizer, the color-correcting agent, the metal salt and the other additives may be added in the middle of the process of polymerizing the biodegradable polyester resin.

By the biodegradable polyester resin according to one embodiment, a biodegradable polyester film may be prepared.

The thickness of the biodegradable polyester film may range from about 5 μm to about 300 μm. For example, the thickness of the biodegradable polyester film may range from about 5 μm to about 180 μm, about 5 μm to about 160 μm, about 10 μm to about 150 μm, about 15 μm to about 130 μm, about 20 μm to about 100 μm, about 25 μm to about 80 μm or about 25 μm to about 60 μm.

The biodegradable polyester film according to one embodiment may have substantially the same hydrolysis degree and biodegradability as the biodegradable polyester resin composition described above.

Meanwhile, the biodegradable polyester film may be prepared using the biodegradable polyester resin or a biodegradable polyester resin pellet.

Specifically, the method of preparing the biodegradable polyester film may include a step of preparing a biodegradable resin composition according to one example and a step of drying and melt extruding the biodegradable resin composition.

In the step of drying and melt extruding the biodegradable resin polyester composition, the drying may be performed at about 60° C. to about 100° C. for about 2 hours to about 12 hours. Specifically, the drying may be performed at about 65° C. to about 95° C., about 70° C. to about 90° C. or about 75° C. to about 85° C. for about 3 hours to about 12 hours or about 4 hours to about 10 hours. When the drying conditions of the pellet satisfy the ranges, the quality of a produced biodegradable polyester film or molded article may be further improved. A moisture content in the biodegradable polyester resin composition subjected to the drying step may be about 500 ppm or less based on the total weight of the biodegradable polyester resin composition.

In the drying and melt extruding step, the melt extruding may be performed at about 270° C. or less. For example, the melt extruding may be performed at about 265° C. or less, about 260° C. or less, about 255° C. or less, about 150° C. to about 270° C., about 150° C. to about 255° C. or about 150° C. to about 240° C. The melt extruding may be performed by a blown film process. The melt extruding may proceed in a T-die.

In addition, the film preparation process may be a calendering process.

Biodegradable Polyester Molded Article

A biodegradable polyester molded article may be manufactured using the biodegradable polyester resin.

Specifically, the molded article may be manufactured by molding the biodegradable polyester resin composition in a method, such as extrusion or injection, known in the art, and the molded article may be an injection-molded article, an extrusion-molded article, a thin-film molded product, a blow molding or blow-molded article, 3D filament, an interior material for construction, or the like, but the present disclosure is not limited thereto.

Figure 2:
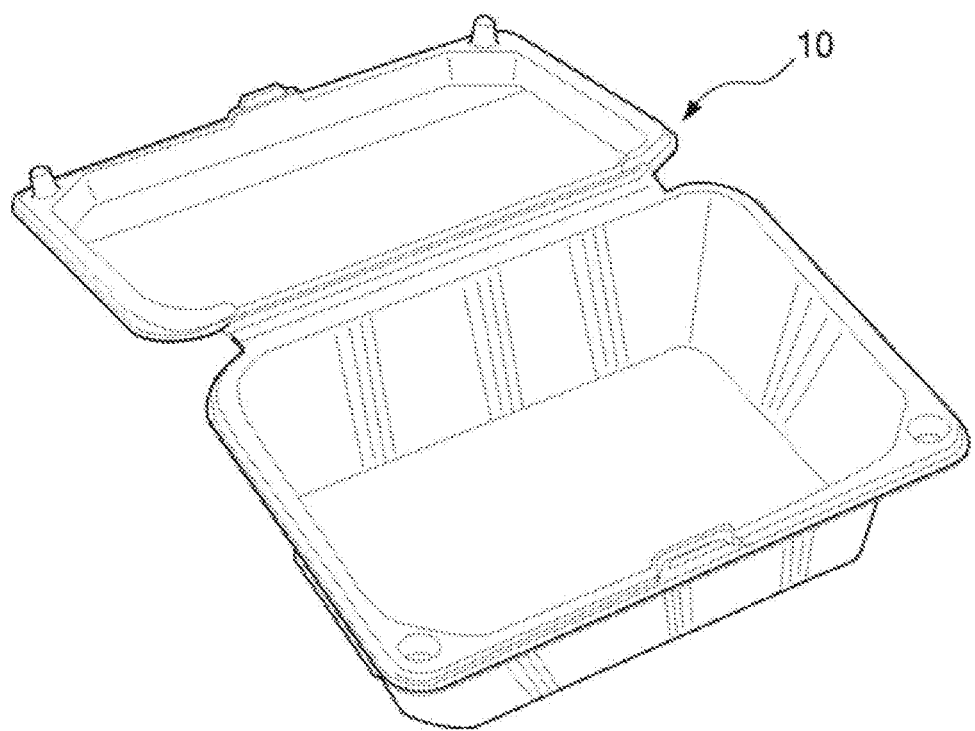
FIG. 2 illustrates a biodegradable molded article formed of a polyester resin composition according to one embodiment of the present disclosure.

For example, the molded article may be in the form of a film or sheet that can be used as an agricultural mulching film, disposable gloves, a disposable film, a disposable bag, a food packaging material, a volume-rate garbage bag, etc., and may be in the form of a fiber that can be used as woven, knitted, non-woven, or a rope. In addition, as shown in FIG. 2, the molded article may be in the form of a disposable container that can be used as a container for packaging food such as a lunch box. In addition, the molded article may be a molded article in various forms such as a disposable straw, a cutlery (spoon), a food plate, or a fork.

In particular, since the molded article may be formed from the biodegradable polyester resin capable of improving physical properties such as shock absorption energy and hardness, in particular, impact resistance and durability, it may exhibit excellent properties when applied to packaging materials for products stored and transported at low temperatures, interior materials for automobiles requiring durability, garbage bags, mulching films, and disposable products.

The physical properties of the biodegradable film and the biodegradable molded article may be measured in a manner similar to those of the biodegradable polyester resin composition according to one embodiment.

The biodegradability of the biodegradable polyester resin composition according to one embodiment may be measured by the following method.

To measure the biodegradability, the biodegradable polyester resin composition according to an embodiment was mixed with compost, and a biodegradation acceleration test was conducted at 60° C. and a humidity 90%. After a certain period, the number average molecular weight of the biodegradable polyester resin composition according to one embodiment was measured using gel permeation chromatography (GPC). A biodegradability was derived by dividing a difference between an initial number average molecular weight and a number average molecular weight after biodegradation for a certain period by the initial number average molecular weight.

The biodegradability may be represented by Equation 10 below:

$$\text{Biodegradability (\%)} = \frac{\text{Initial number average molecular weight} - \text{number average molecular weight after biodegradation}}{\text{Initial number average molecular weight}} \times 100 \quad \text{[Equation 10]}$$

Here, the biodegradable polyester resin composition according to this embodiment is mixed with compost and subjected to a biodegradation acceleration test at 60° C. and a humidity of 90% for a certain period. An initial number average molecular weight of the biodegradable polyester resin composition before performing the biodegradability acceleration test and a number average molecular weight after biodegradation of the biodegradable polyester resin composition subjected to the biodegradation acceleration test for a certain period are measured by gel permeation chromatography (GPC).

The biodegradability was derived by dividing a difference between the initial number average molecular weight and the number average molecular weight after biodegradation for a certain period by an initial number average molecular weight.

In addition, the compost may include about 40 wt % of pig manure, about 15 wt % of chicken manure, about 37 wt % of sawdust, about 5 wt % of zeolite and about 3 wt % of a microbial agent.

In addition, the compost may be Jisaengto (by-product fertilizer grade 1 compost) manufactured by Taeheung F&G.

In addition, when measuring the biodegradability, the biodegradable polyester resin composition according to one embodiment is manufactured as a sheet having a thickness of about 300 μm. Next, the manufactured sheet is cut into a size of about 30 mm×30 mm to produce flakes. The flakes are mixed with the compost, and the biodegradation acceleration test is performed.

In the biodegradable polyester resin composition according to this biodegradability characterization embodiment, a biodegradability after one week may be about 40% to about 70%. In the biodegradable polyester resin composition according to this embodiment, the biodegradability after one week may be about 45% to about 65%. In the biodegradable polyester resin composition according to this embodiment, the biodegradability after one week may be about 47% to about 63%. In the biodegradable polyester resin composition according to this embodiment, the biodegradability after one week may be about 49% to about 62%.

In the biodegradable polyester resin composition according to this biodegradability characterization embodiment, the biodegradability after two weeks may be about 50% to about 70%. In the biodegradable polyester resin composition according to this embodiment, the biodegradability after two weeks may be about 55% to about 68%.

In the biodegradable polyester resin composition according to this biodegradability characterization embodiment, a biodegradability after three weeks may be about 63% to about 75%. In the biodegradable polyester resin composition according to this embodiment, the biodegradability after three weeks may be about 63% to about 73%.

In the biodegradable polyester resin composition according to this biodegradability characterization embodiment, a biodegradability after four weeks may be about 73% to about 85%. In the biodegradable polyester resin composition according to this embodiment, the biodegradability after four weeks may be 75% to 82%.

In the biodegradable polyester resin composition according to this biodegradability characterization embodiment, a biodegradability after six weeks may be about 80% to about 90%. In the biodegradable polyester resin composition according to this embodiment, the biodegradability after six weeks may be about 82% to about 88%.

In the biodegradable polyester resin composition according to this biodegradability characterization embodiment, a biodegradability after nine weeks may be about 85% or more. In the biodegradable polyester resin composition according to this embodiment, the biodegradability after nine weeks may be about 87% or more. In the biodegradable polyester resin composition according to this embodiment, the biodegradability after nine weeks may be about 88% or more. In the biodegradable polyester resin composition according to this embodiment, the biodegradability after nine weeks may be about 89% or more. In the biodegradable polyester resin composition according to this embodiment, the biodegradability after nine weeks may be about 90% or more.

Since the biodegradable polyester resin composition according to one embodiment has a biodegradability and since the biodegradability increases as described above, the biodegradable polyester resin composition may have appropriate durability in real life and a high biodegradability degree when discarded after use.

The hydrolysis degree of the biodegradable polyester resin composition according to one embodiment may be measured by the following method.

To measure the hydrolysis degree, the biodegradable polyester resin composition according to this hydrolysis degree characterization example is immersed in 80° C. water (100% RH), and a hydrolysis acceleration test is performed. After a certain period, the number average molecular weight of the biodegradable polyester resin composition according to this embodiment was measured using gel permeation chromatography (GPC). A hydrolysis degree was derived by dividing a difference between an initial number average molecular weight and a number average molecular weight after hydrolysis for a certain period by the initial number average molecular weight.

The hydrolysis degree may be calculated by Equation 12 below.

$$\text{Hydrolysis degree (\%)} = \frac{\text{Initial number average molecular weight} - \text{Number average molecular weight after hydrolysis}}{\text{Initial number average molecular weight}} \times 100 \quad [\text{Equation 11}]$$

Here, the biodegradable polyester resin composition according to this hydrolysis degree characterization embodiment is immersed in 80° C. water, and then subjected to a hydrolysis acceleration test for a certain period. An initial number average molecular weight of the biodegradable polyester resin composition before performing the hydrolysis acceleration test and a number average molecular weight after hydrolysis of the biodegradable polyester resin composition subjected to the hydrolysis acceleration test for a certain period are measured by gel permeation chromatography (GPC).

The hydrolysis degree was derived by dividing a difference between the initial number average molecular weight and the number average molecular weight after hydrolysis for a certain period by an initial number average molecular weight.

In addition, when measuring the hydrolysis degree, the biodegradable polyester resin composition according to one embodiment is manufactured to a sheet having a thickness of about 300 μm. Next, the manufactured sheet is cut into a size of about 30 mm×30 mm to produce flakes. The flakes may be immersed in the hot water, and the hydrolysis acceleration test may be performed.

In the biodegradable polyester resin composition according to this hydrolysis degree characterization embodiment, a hydrolysis degree after one week may be about 40% to about 65%. In the biodegradable polyester resin composition according to this embodiment, the hydrolysis degree after one week may be about 45% to about 63%.

In the biodegradable polyester resin composition according to this hydrolysis degree characterization embodiment, a hydrolysis degree after two weeks may be about 80% to about 93%. In the biodegradable polyester resin composition according to this embodiment, the hydrolysis degree after two weeks may be about 85% to about 92%.

In the biodegradable polyester resin composition according to this hydrolysis degree characterization embodiment, a hydrolysis degree after three weeks may be about 90% to about 97%. In the biodegradable polyester resin composition according to this embodiment, a hydrolysis degree after three weeks may be about 91% to about 96%.

In the biodegradable polyester resin composition according to this hydrolysis degree characterization embodiment, a hydrolysis degree after four weeks may be about 92% to about 99%. In the biodegradable polyester resin composition according to this embodiment, a hydrolysis degree after four weeks may be about 93% to about 97%.

In the biodegradable polyester resin composition according to this hydrolysis degree characterization embodiment, a hydrolysis degree after six weeks may be about 94% or more. In the biodegradable polyester resin composition according to this embodiment, a hydrolysis degree after six weeks may be about 95% or more.

In the biodegradable polyester resin composition according to this hydrolysis degree characterization embodiment, a hydrolysis degree after nine weeks may be about 95% or more. In the biodegradable polyester resin composition according to this embodiment, a hydrolysis degree after nine weeks may be about 96% or more.

Since the biodegradable polyester resin composition according to one embodiment has a hydrolysis degree and since the hydrolysis degree increases, the biodegradable polyester resin composition (according to one embodiment) has appropriate durability in daily life and may be hydrolyzed when discarded. That is, since the biodegradable polyester resin composition according to one embodiment has a hydrolysis degree and the hydrolysis degree increases, it may have sufficient hydrolysis resistance when used for an appropriate period of time, such as in disposable packaging. In addition, the biodegradable polyester resin composition according to one embodiment may be degraded by hydrolysis and biodegradation when sufficient time passes, not only when disposed of in the soil, but also when disposed of in a river or a sea.

In the biodegradable polyester resin composition according to one embodiment, a biodegradability per aliphatic carboxylic acid may be about 1.7 or more. In addition, the biodegradability per aliphatic carboxylic acid may be about 1.75 or more. The biodegradability per aliphatic carboxylic acid may be about 1.79 or more. The biodegradability per aliphatic carboxylic acid may be about 1.8 or more. The biodegradability per aliphatic carboxylic acid may be about 1.85 or more. The biodegradability per aliphatic carboxylic acid may be about 1.90 or more. A maximum value of the biodegradability per aliphatic carboxylic acid is about 4.

The biodegradability per aliphatic carboxylic acid is obtained by dividing the biodegradability after nine weeks by a ratio of the aliphatic carboxylic acid based on all dicarboxylic acids. The biodegradability per aliphatic carboxylic acid is obtained by dividing the biodegradability after nine weeks by a mol % ratio of the aliphatic carboxylic acid based on all dicarboxylic acids.

The biodegradability per aliphatic carboxylic acid may be represented by Equation 12 below:

$$\text{Biodegradability per aliphatic carboxylic acid} = \frac{\text{Biodegradability after 9 weeks}}{\text{Content (mol \%) of aliphatic carboxylic acid in all carboxylic acids}} \quad \text{[Equation 12]}$$

The biodegradable polyester resin composition according to this embodiment may have a crystallization temperature (Tc). When the biodegradable polyester resin composition (according to one embodiment) includes the polyester resin as a main component, the crystallization temperature of the biodegradable polyester resin composition according to this embodiment may be substantially the same as the crystallization temperature of the polyester resin.

The crystallization temperature of the biodegradable polyester resin composition according to one embodiment may range from about 38° C. to about 58° C. The crystallization temperature of the biodegradable polyester resin composition according to another embodiment may range from about 40° C. to about 57° C. The crystallization temperature of the biodegradable polyester resin composition according to still another embodiment may range from about 43° C. to about 56° C. The crystallization temperature of the biodegradable polyester resin composition according to yet another embodiment may range from about 45° C. to about 58° C.

The biodegradable polyester resin composition according to one embodiment may have a glass transition temperature (Tg). When the biodegradable polyester resin composition according to this embodiment includes the polyester resin as a main component, the glass transition temperature of the biodegradable polyester resin composition according to this embodiment may be substantially the same as the glass transition temperature of the polyester resin.

The glass transition temperature of the biodegradable polyester resin composition according to one embodiment may range from about −50° C. to about −15° C. The glass transition temperature of the biodegradable polyester resin composition according to another embodiment may range from about −37° C. to about −15° C. The glass transition temperature of the biodegradable polyester resin composition according to still another embodiment may range from about −30° C. to about −20° C. The glass transition temperature of the biodegradable polyester resin composition according to yet another embodiment may range from about −30° C. to about −21° C.

The biodegradable polyester resin composition according to one embodiment may have a melting point (Tm). When the biodegradable polyester resin composition according to this embodiment includes the polyester resin as a main component, the melting point of the biodegradable polyester resin composition according to this embodiment may be substantially the same as the melting point of the polyester resin.

The melting point of the biodegradable polyester resin composition according to one embodiment may range from about 70° C. to about 130° C. The melting point of the biodegradable polyester resin composition according to another embodiment may range from about 99° C. to about 122° C. The melting point of the biodegradable polyester resin composition according to still another embodiment may range from about 105° C. to about 122° C. The melting point of the biodegradable polyester resin composition according to yet another embodiment may range from about 110° C. to about 122° C. The melting point of the biodegradable polyester resin composition according to a further embodiment may range from about 110° C. to about 130° C.

To measure the crystallization temperature, glass transition temperature and melting point of the biodegradable polyester resin composition, film and molded article according to an embodiment, a sample having a weight of about 5 mg to about 10 mg may be obtained from the biodegradable polyester resin composition, film and molded article according to one embodiment.

The sample is fed into a differential scanning calorimeter (for example, Q2000, TA Instruments) and stabilized at about 25° C. for about 1 minute. Next, the sample is cooled at a rate of about −5° C./min to about −70° C. and heated up to about 200° C. at a rate of about 10° C./min. Next, the sample is allowed to stand at about 200° C. for about 1 minute, and then cooled to about 25° C. An enthalpy change in the process of heating and cooling the sample may be measured. Here, a minimum point of an endothermic peak may be a melting point (Tm). In addition, a point where heat flow starts to change represents a glass transition temperature (Tg), and a maximum temperature of the exothermic peak represents a crystallization temperature (Tc).

Since the biodegradable polyester resin composition, film and molded article according to one embodiment have a crystallization temperature, glass transition temperature and melting point within the ranges above, they may have appropriate mechanical characteristics, appropriate biodegradability, appropriate hydrolysis, appropriate thermal properties and appropriate chemical resistance. In particular, since the biodegradable polyester resin composition, film and molded article according to one embodiment have a crystallization temperature, glass transition temperature and melting point within the ranges above, they may have appropriate flexibility.

In addition, the biodegradable polyester resin composition, film and molded article according to an embodiment may have Young's modulus.

In the biodegradable polyester resin composition, film and molded article according to one embodiment, Young's modulus may range from about 20 MPa to about 80 MPa. In the biodegradable polyester resin composition, film and molded article according to another embodiment, Young's modulus may range from about 25 MPa to about 60 MPa. In the biodegradable polyester resin composition, film and molded article according to still another embodiment, Young's modulus may range from about 29 MPa to about 50 MPa. In the biodegradable polyester resin composition, film and molded article according to yet another embodiment, Young's modulus may range from about 35 MPa to about 60 MPa.

In the biodegradable polyester resin composition, film and molded article according to one embodiment, an initial elongation at break may range from about 800% to about 1200%. In the biodegradable polyester resin composition, film and molded article according to another embodiment, the initial elongation at break may range from about 800% to about 1100%. In the biodegradable polyester resin composition, film and molded article according to still another embodiment, the initial elongation at break may range from about 850% to about 1050%.

The biodegradable polyester resin composition according to one embodiment is dried at about 80° C. for about 1 hour, placed in a stainless steel mold, and compressed at about 210° C. under a pressure of about 10 MPa for about 3 minutes, thereby manufacturing a biodegradable polyester sheet having a thickness of about 300 μm.

After the biodegradable polyester sheet, film, and molded article (according to this embodiment) are cut based on ASTM D638 V-type to manufacture a specimen, the specimen is tested at a tensile speed of 100 mm/min by a universal testing machine (UTM, model name: 4206-001) of INSTRON, and then Young's modulus (kgf/mm$^2$=9.8 Mpa) and an elongation at break may be measured by the program programmed in the equipment.

The biodegradability per aliphatic carboxylic acid may be in the above ranges by appropriately controlling the number of the first blocks, the number of the second blocks, the alternating ratio, the hard segment ratio, the soft segment ratio, the composition of the biodegradable polyester resin such as the content of the aliphatic dicarboxylic acid or the content of the aromatic dicarboxylic acid, conditions of the process of preparing the biodegradable polyester resin, the reinforcing material, the metal salt, the anti-hydrolysis agent, the chain extender, the oligomer, the heat stabilizer, or the like.

In particular, the biodegradable polyester resin composition according to one embodiment includes a polyester resin having an appropriate soft segment ratio. The amount of a diol bonded between the aliphatic dicarboxylic acid and the aliphatic dicarboxylic acid may be appropriate.

Accordingly, the biodegradable polyester resin may appropriately include the structure wherein one aliphatic dicarboxylic acid and another aliphatic dicarboxylic acid are boned to the diol. Accordingly, the biodegradable polyester resin may have appropriate crystal properties, and the biodegradable polyester resin composition (according to one embodiment) may have appropriate thermal and mechanical properties.

In particular, since the biodegradable polyester resin has a soft segment ratio within the ranges noted above for the soft segment ratio, the biodegradable polyester resin composition (according to an embodiment) may have an appropriate Young's modulus, an appropriate glass transition temperature, an appropriate crystallization temperature and an appropriate melting point.

In particular, since the biodegradable polyester resin composition according to one embodiment has the above-described molecular structure, it may have appropriate flexibility. At the same time, since the biodegradable polyester resin composition according to this embodiment has the above-described molecular structure, it may not stick to other substances.

In addition, since the biodegradable polyester resin may include the structure wherein the diol is bonded between the aliphatic dicarboxylic acid and the aliphatic dicarboxylic acid in an appropriate content, the biodegradable polyester resin composition according to one embodiment may have both appropriate hydrolysis and improved biodegradability.

Therefore, the biodegradable polyester resin composition according to one embodiment has suitable flexibility for a practical use period and may be easily biodegraded after use.

In particular, the biodegradable polyester resin composition according to this embodiment may be efficiently applied to a film for packaging and the like. That is, a film made of the biodegradable polyester resin composition (according to one embodiment) may be used for general purposes such as packaging. Here, the biodegradable polyester resin composition (according to one embodiment) may maintain appropriate flexibility and chemical properties during a general use period.

The biodegradability per the aliphatic carboxylic acid may be in the above range by appropriately controlling the number of the first blocks, the number of the second blocks, the alternating ratio, the hard segment ratio, the soft segment ratio, the composition of the biodegradable polyester resin such as the content of the aliphatic dicarboxylic acid or the content of the aromatic dicarboxylic acid, conditions of the process of preparing the biodegradable polyester resin, the reinforcing material, the metal salt, the anti-hydrolysis agent, the chain extender, the oligomer, the heat stabilizer, or the like.

In particular, the biodegradable polyester resin composition according to an embodiment includes a polyester resin having an appropriate alternating degree. The content of a diol bonded between the aliphatic dicarboxylic acid and the aliphatic dicarboxylic acid may be appropriate.

Accordingly, the biodegradable polyester resin may have a structure wherein the aromatic dicarboxylic acid and the aliphatic dicarboxylic acid are appropriately alternately disposed. Accordingly, the biodegradable polyester resin may have improved crystal properties, and the biodegradable polyester resin composition according to an embodiment may have improved thermal and mechanical properties.

In addition, since the biodegradable polyester resin has a structure wherein the aromatic dicarboxylic acid and the aliphatic dicarboxylic acid are appropriately alternately disposed, the aromatic and aliphatic dicarboxylic acids in the molecule of the biodegradable polyester resin may be appropriately crossed. Accordingly, the biodegradable polyester resin composition according to an embodiment may have both appropriate hydrolysis and improved biodegradability.

In addition, since the biodegradable polyester resin has the above-described molecular structure, the biodegradable polyester resin composition according to an embodiment may have a high biodegradability per an aliphatic dicarboxylic acid content.

The biodegradable polyester resin composition according to an embodiment includes a polyester resin having an appropriate hard segment ratio. The content of a diol bonded between the aromatic dicarboxylic acid and the aromatic dicarboxylic acid may be appropriate.

Accordingly, the biodegradable polyester resin may appropriately include the bonded structure wherein the aromatic dicarboxylic acid and the aromatic dicarboxylic acid are bonded to the diol. Accordingly, the biodegradable polyester resin may have improved crystal properties, and the biodegradable polyester resin composition according to an embodiment may have improved thermal and mechanical properties.

In particular, since the biodegradable polyester resin has a hard segment ratio within the range, the biodegradable polyester resin composition according to an embodiment may have appropriately high tensile strength and appropriately high elongation at break.

In addition, since the biodegradable polyester resin has the above-described molecular structure, it may have appropriate moisture resistance and solvent resistance. Accordingly, the biodegradable polyester resin composition according to an embodiment may have improved printability.

Therefore, the biodegradable polyester resin composition according to an embodiment may be easily biodegraded after use while having improved physical properties during actual use.

In addition, the acid value of the biodegradable polyester resin composition according to an embodiment may be about 0.01 mg KOH/g to about 3 mg KOH/g. The acid value of the biodegradable polyester resin composition according to an embodiment may be about 0.1 mg KOH/g to about 2.8 mg KOH/g. The acid value of the biodegradable polyester resin composition according to an embodiment may be about 0.1 mg KOH/g to about 2.5 mg KOH/g.

Since the biodegradable polyester resin composition according to an embodiment has an acid value within the range, it may have hydrolysis and biodegradability characteristics as described above.

A molded article made of the biodegradable polyester resin composition according to an embodiment may be efficiently decomposed when discarded while maintaining required mechanical properties within an actual use period.

The above contents are described in more detail through the following examples. However, the following examples are only for illustrating the present disclosure, and the scope of the present disclosure is not limited thereto.

Preparation Example

Preparation of Pretreated Cellulose Nanocrystals (CNC)

Dry powder-type cellulose nanocrystals (NVC-100, Manufacturer: Celluforce) having a particle size of about 1 µm to about 50 µm were dispersed in water at 1% by weight, and then sonicated at an output of 20000 J/s for 1 minute using a tip-type ultrasonic disperser, thereby producing pretreated nanocellulose.

EXAMPLE

Example 1

Preparation of Biodegradable Polyester Resin
First Step: Pretreating to Obtain Slurry As shown in Table 1, pretreated nanocellulose, 1,4-butanediol (1,4-BDO) and terephthalic acid (TPA) were mixed in a molar ratio (1,4-BDO:TPA) of 1.2:1 and fed into a slurry tank (the bottom of the slurry tank was an anchor type, the height to an agitator was 40 mm, and three rotary blades were provided) in a non-catalytic state. Here, D50 of the terephthalic acid (TPA) was 120 µm.

Next, the mixture was pretreated by stirring at 60° C. and 100 rpm for 1 hour, and a slurry was obtained by phase separation.

Second Step: Obtaining Prepolymer

A mixture (the molar ratio of 1,4-butanediol, terephthalic acid and adipic acid was 1.2:1:0.2) of about 274 parts by weight of a slurry obtained in the first step, about 18 parts by weight of the 1,4-butanediol and about 29.2 parts by weight of adipic acid was fed into a reactor through a supply line, and tetrabutyl titanate (Dupont, Tyzor TnBT product) as a titanium-based catalyst was fed at 250 ppm thereinto, followed by performing a first esterification at 220° C. under normal pressure for about 2 hours until 95% of by-product water was discharged.

A mixture (the molar ratio of 1,4-butanediol, terephthalic acid and adipic acid was 1.264:0.064:1) of about 16.4 parts by weight of a slurry, about 108 parts by weight of 1,4-butanediol (1,4-BDO) and about 146 parts by weight of adipic acid (AA) was added to the reaction product, and tetrabutyl titanate (Dupont, Tyzor TnBT product) as a titanium-based catalyst was added in a content of 200 ppm based on the total weight of the reaction product and the additional mixture. Next, a second esterification was performed for about 2 hours at 210° C. under normal pressure until 95% of by-products was discharged, thereby producing a prepolymer having a number average molecular weight of 1300 g/mol.

Third Step: Polycondensing wt % of the prepared oligomer, 400 ppm of tetrabutyl titanate (Dupont, Tyzor TnBT product) as a titanium-based catalyst and 500 ppm of a triethylene phosphate stabilizer, based on the total weight of the prepolymer, were added to the prepolymer and stabilized for about 10 minutes. Next, the temperature of the reaction mixture was elevated to 250° C., and then a polycondensation reaction was carried out at 0.5 Torr for 4 hours, thereby preparing a polymer having a number average molecular weight of 55000 g/mol.

Next, the polymer was cooled to 5° C., and then cut with a pellet cutter, thereby obtaining a biodegradable polyester resin pellet.

Examples 3 to 7 and Comparative Examples 1 and 2

As shown in Tables 1 and 2 below, the compositions of reactants and process conditions in the first esterification and the second esterification were varied. Except for the contents and the process, other processes were carried out in the substantially same manner as in Example 1.

Examples 8 to 14

As shown in Tables 3 and 4 below, the compositions of reactants and process conditions in the first esterification and the second esterification were varied. Other processes, except for the contents and the processes, were substantially the same as those of Example 1.

Manufacture of Biodegradable Polyester Sheet

After preparing two Teflon sheets, a stainless steel (SUS) mold (area: 12 cm×12 cm) was placed on one Teflon sheet, and about 7 g of the prepared polyester resin pellet was put into the stainless steel (SUS) mold (area: 12 cm×12 cm). Next, the mold was covered with another Teflon sheet, and placed in the center of a hot press (manufacturer: Widlab, model name: WL 1600SA) having a surface size of about 25 cm×25 cm. The mold was maintained at about 210° C. under a pressure of about 10 MPa for about 3 minutes, and then detached, followed by immediately cooling in water of 20° C. for about 30 seconds. Next, a biodegradable polyester sheet having an area of about 10 cm×10 cm and a thickness of about 300 µm was manufactured.

Manufacture of Biodegradable Polyester Film

After drying the biodegradable polyester resin pellet at 80° C. for 5 hours, melt extrusion was carried out at 160° C. using Blown Film Extrusion Line (Manufacturer: YOOJIN ENGINEERING), thereby manufacturing a biodegradable polyester film having a thickness of 50 µm.

TABLE 1

| Classification | First reaction slurry (parts by weight) | First reaction BDO (parts by weight) | First reaction AA (parts by weight) | Second reaction slurry (parts by weight) | Second reaction BDO (parts by weight) | Second reaction AA (parts by weight) | CNC (ppm) |
|---|---|---|---|---|---|---|---|
| Example 1 | 274 | 18 | 29.2 | 16.4 | 108 | 146 | 700 |
| Example 2 | 274 | 18 | 29.2 | 33 | 108 | 146 | |
| Example 3 | 274 | 27 | 43.8 | 33 | 108 | 146 | |
| Example 4 | 274 | 18 | 29.2 | 51.2 | 108 | 146 | 700 |
| Example 5 | 274 | 27 | 58.8 | 16.4 | 108 | 146 | |
| Example 6 | 274 | 9 | 14.6 | 16.4 | 108 | 146 | |
| Example 7 | 274 | 36 | 58.4 | 51.2 | 108 | 146 | 700 |
| Comparative Example 1 | 308 | | | | 108 | 146 | |
| Comparative Example 2 | 225 | | | | 108 | 146 | |

TABLE 2

| Classification | First esterification temperature (° C.) | First esterification time | Second esterification temperature (° C.) | Second esterification time | Pretreatment |
|---|---|---|---|---|---|
| Example 1 | 220 | 2 | 220 | 2 | ○ |
| Example 2 | 205 | 1.5 | 215 | 2.5 | ○ |
| Example 3 | 200 | 2.0 | 205 | 2.0 | ○ |
| Example 4 | 195 | 2.0 | 210 | 2.0 | ○ |
| Example 5 | 200 | 1.5 | 210 | 2.5 | ○ |
| Example 6 | 200 | 1.5 | 210 | 2.0 | ○ |
| Example 7 | 200 | 2.0 | 205 | 2.0 | ○ |
| Comparative Example 1 | 200 | 2.0 | 205 | 2.0 | X |
| Comparative Example 2 | 200 | 2.0 | 205 | 2.0 | X |

TABLE 3

| Classification | First reaction slurry (parts by weight) | First reaction BDO (parts by weight) | First reaction AA (parts by weight) | Second reaction a slurry (parts by weight) | Second reaction BDO (parts by weight) | Second reaction AA (parts by weight) | CNC (ppm) |
|---|---|---|---|---|---|---|---|
| Example 8 | 256 | | | 16.4 | 108 | 175.2 | 700 |
| Example 9 | 256 | | | 33 | 108 | 175.2 | |
| Example 10 | 256 | | | 33 | 117 | 189.8 | |
| Example 11 | 256 | | | 51.2 | 108 | 175.2 | 700 |
| Example 12 | 256 | | | 16.4 | 117 | 175.2 | |
| Example 13 | 256 | | | 16.4 | 99 | 160.6 | |
| Example 14 | 256 | | | 51.2 | 126 | 204.4 | 700 |

TABLE 4

| Classification | First esterification temperature (° C.) | First esterification time | Second esterification temperature (° C.) | Second esterification time | Pretreatment |
|---|---|---|---|---|---|
| Example 8 | 220 | 2 | 220 | 2 | ○ |
| Example 9 | 215 | 1.5 | 215 | 2.5 | ○ |
| Example 10 | 210 | 2.0 | 205 | 2.0 | ○ |
| Example 11 | 205 | 2.0 | 210 | 2.0 | ○ |
| Example 12 | 205 | 1.5 | 210 | 2.5 | ○ |
| Example 13 | 205 | 1.5 | 210 | 2.0 | ○ |
| Example 14 | 210 | 2.0 | 215 | 2.0 | ○ |

EVALUATION EXAMPLES

Evaluation Example 1: An Average Particle Diameter (D50) and a Standard Deviation <Average Particle Diameter (D50) and Standard Deviation of Aromatic Dicarboxylic Acid>

With regard to a particle size distribution (PSD), the average particle diameter (D50) and standard deviation (SD) of an aromatic dicarboxylic acid (TPA or DMT) were obtained using a particle size analyzer Microtrac S3500 (Microtrac Inc) according to the following conditions:

Use Environment
    Temperature: 10 to 35° C., humidity: 90% RH, non-condensing maximum
    D50 and SD, which are average particle size distributions for each section, were measured.

The standard deviation means the square root of the variance and may be calculated using the software.

<Particle Diameter of Nanocellulose>

The particle size and average particle deviation of nanocellulose were measured using the principle of dynamic light scattering (DLS) at 25° C. and a measurement angle of 175° using Zetasizer Nano ZS (Manufacturer: Marven). Here, a peak value derived through the polydispersity index (PdI) in a confidence interval of 0.5 was measured as a particle diameter.

Evaluation Example 2: Hydrolysis Degree

The biodegradable polyester resins prepared in the examples and the comparative examples were immersed in 80° C. water (100% RH), and then an accelerated hydrolysis test was carried out.

Specifically, 5 g of each of the polyester resins of the examples and the comparative examples was added to 500 mL of deionized water (DI Water), and then blocked with a stopper to prevent water from evaporating and subjected to an accelerated hydrolysis test in an 80° C. convection (hot air) oven. The humidity environment of the biodegradable polyester sheet is the same as that at 100% RH because it is created by immersion in water.

The number average molecular weights of the polyester resins of the examples and the comparative examples after a certain period were measured using gel permeation chromatography (GPC). A hydrolysis degree was derived by dividing a difference between the initial number average molecular weight and the number average molecular weight after a certain period by the initial number average molecular weight.

GPC equipment and measurement conditions are as follows:
    Sample pretreatment: 0.035 mg of PBAT chip was dissolved in 1.5 ml of THF
    Measurement apparatus: e2695 manufactured by Waters
    Flow rate: 1 ml/min in tetrahydrofuran (THF)
    Flow amount: 50 µl
    Column temperature: 40° C.
    Detector: Evaporative Light Scattering Detector (ELSD)
    Column: Styragel Column HR 5E, HR4, HR2

Evaluation Example 3: Biodegradability

Each of the biodegradable polyester resins prepared in the examples and the comparative examples was mixed with the following compost, and was subjected to a biodegradation acceleration test at 60° C. and a relative humidity of 90%.

The number average molecular weight of each of the polyester resins of the examples and the comparative examples was measured using the gel permeation chromatography (GPC) after a certain period. Biodegradability was derived by dividing the difference between the initial number average molecular weight and the number average molecular weight after a certain period by the initial number average molecular weight.

Compost
    Manufacturer: Taeheung F&G
    Product Name: Jisaengto (by-product fertilizer grade 1 compost)
    Compost components: 40 wt % of pig manure, 15 wt % of chicken manure, 37 wt % of sawdust, 5 wt % of zeolite, a microbial agent 3 wt %

Evaluation Example 4: Nuclear Magnetic Resonance Spectroscopy

About 5 mg of a sample was prepared from each of the biodegradable polyester resin compositions of the examples and the comparative examples, and the sample was dissolved in CDCl3. Next, the $^1$H-NMR of the solution was analyzed using a nuclear magnetic resonance (NMR) instrument (company JEOL, 500 MHz, 90° pulse) at room temperature. Next, in the obtained NMR data, the peaks of the terephthalic acid, the adipic acid and the 1,4-butanediol were integrated.

Apparatus: JNM-LA3000 manufactured by JEOL
    Pulse: about 90°
    Repeat time: about 4 sec
    Number of integrations: 8 measurements
    Temperature: about 25° C.

As shown in Tables 5 and 6 below, the biodegradability of the examples and the comparative examples was measured:

TABLE 5

| Classification | Molecular weight reduction rate (%) after 7 days | Molecular weight reduction rate (%) after 14 days | Molecular weight reduction rate (%) after 21 days | Molecular weight reduction rate (%) after 28 days | Molecular weight reduction rate (%) after 42 days | Molecular weight reduction rate (%) after 63 days |
|---|---|---|---|---|---|---|
| Example 1 | 54 | 62 | 71 | 78 | 87 | 91 |
| Example 2 | 52 | 63 | 71 | 78 | 88 | 90 |
| Example 3 | 52 | 61 | 70 | 78 | 88 | 91 |
| Example 4 | 52 | 61 | 70 | 78 | 87 | 91 |
| Example 5 | 57 | 64 | 71 | 79 | 86 | 91 |
| Example 6 | 52 | 62 | 70 | 78 | 86 | 90 |
| Example 7 | 53 | 61 | 70 | 79 | 87 | 91 |
| Comparative Example 1 | 46 | 52 | 65 | 74 | 82 | 85 |

TABLE 5-continued

| Classification | Molecular weight reduction rate (%) after 7 days | Molecular weight reduction rate (%) after 14 days | Molecular weight reduction rate (%) after 21 days | Molecular weight reduction rate (%) after 28 days | Molecular weight reduction rate (%) after 42 days | Molecular weight reduction rate (%) after 63 days |
|---|---|---|---|---|---|---|
| Comparative Example 2 | 60 | 64 | 76 | 83 | 89 | 92 |

TABLE 6

| Classification | Molecular weight reduction rate (%) after 7 days | Molecular weight reduction rate (%) after 14 days | Molecular weight reduction rate (%) after 21 days | Molecular weight reduction rate (%) after 28 days | Molecular weight reduction rate (%) after 42 days | Molecular weight reduction rate (%) after 63 days |
|---|---|---|---|---|---|---|
| Example 8 | 54 | 63 | 71 | 78 | 87 | 91 |
| Example 9 | 53 | 64 | 71 | 78 | 88 | 90 |
| Example 10 | 52 | 61 | 70 | 78 | 88 | 91 |
| Example 11 | 53 | 62 | 70 | 78 | 87 | 91 |
| Example 12 | 56 | 64 | 71 | 79 | 86 | 91 |
| Example 13 | 52 | 62 | 71 | 78 | 86 | 90 |
| Example 14 | 53 | 62 | 70 | 79 | 87 | 91 |

As shown in Tables 7 and 8 below, hydrolysis degrees were measured.

TABLE 7

| Classification | Molecular weight reduction rate (%) after 7 days | Molecular weight reduction rate (%) after 14 days | Molecular weight reduction rate (%) after 21 days | Molecular weight reduction rate (%) after 28 days | Molecular weight reduction rate (%) after 42 days | Molecular weight reduction rate (%) after 63 days |
|---|---|---|---|---|---|---|
| Example 1 | 47 | 87 | 94 | 95 | 97 | 97 |
| Example 2 | 52 | 89 | 94 | 96 | 97 | 97 |
| Example 3 | 57 | 87 | 94 | 96 | 97 | 97 |
| Example 4 | 47 | 87 | 94 | 95 | 96 | 97 |
| Example 5 | 51 | 88 | 94 | 96 | 97 | 97 |
| Example 6 | 58 | 89 | 94 | 96 | 97 | 97 |
| Example 7 | 49 | 87 | 94 | 96 | 97 | 97 |
| Comparative Example 1 | 45 | 86 | 93 | 95 | 96 | 96 |
| Comparative Example 2 | 65 | 90 | 95 | 97 | 97 | 97 |

TABLE 8

| Classification | Molecular weight reduction rate (%) after 7 days | Molecular weight reduction rate (%) after 14 days | Molecular weight reduction rate (%) after 21 days | Molecular weight reduction rate (%) after 28 days | Molecular weight reduction rate (%) after 42 days | Molecular weight reduction rate (%) after 63 days |
|---|---|---|---|---|---|---|
| Example 8 | 48 | 87 | 94 | 95 | 97 | 97 |
| Example 9 | 51 | 89 | 94 | 96 | 97 | 97 |
| Example 10 | 56 | 87 | 94 | 96 | 97 | 97 |
| Example 11 | 46 | 87 | 94 | 95 | 96 | 97 |
| Example 12 | 52 | 88 | 94 | 96 | 97 | 97 |
| Example 13 | 57 | 89 | 94 | 96 | 97 | 97 |
| Example 14 | 50 | 87 | 94 | 96 | 97 | 97 |

As shown in Tables 9 and 10, peaks by $^1$H-NMR and the areas of the peaks were measured.

TABLE 9

| Classification | 8.085 ppm | 4.423 ppm | 4.366 ppm | 4.148 ppm | 4.078 ppm | 2.324 ppm | 1.963 ppm | 1.84 ppm | 1.806 ppm | 1.681 ppm | 1.648 ppm |
|---|---|---|---|---|---|---|---|---|---|---|---|
| Example 1 | 1 | 0.46 | 0.50 | 0.5 | 0.54 | 1.04 | 0.45 | 0.51 | 0.55 | 0.54 | 1.06 |
| Example 2 | 1 | 0.47 | 0.53 | 0.52 | 0.57 | 1.07 | 0.48 | 0.53 | 0.55 | 0.57 | 1.05 |
| Example 3 | 1 | 0.48 | 0.51 | 0.51 | 0.54 | 1.06 | 0.48 | 0.51 | 0.50 | 0.54 | 1.11 |
| Example 4 | 1 | 0.46 | 0.51 | 0.52 | 0.54 | 1.11 | 0.47 | 0.52 | 0.49 | 0.54 | 1.08 |
| Example 5 | 1 | 0.47 | 0.52 | 0.52 | 0.58 | 1.10 | 0.46 | 0.54 | 0.56 | 0.57 | 1.07 |
| Example 6 | 1 | 0.46 | 0.50 | 0.52 | 0.56 | 1.06 | 0.47 | 0.52 | 0.50 | 0.54 | 1.10 |
| Example 7 | 1 | 0.45 | 0.53 | 0.52 | 0.57 | 1.08 | 0.45 | 0.53 | 0.55 | 0.56 | 1.09 |
| Comparative Example 1 | 1 | 0.75 | 0.31 | 0.32 | 0.38 | 0.72 | 0.74 | 0.32 | 0.31 | 0.38 | 0.73 |
| Comparative Example 2 | 1 | 0.25 | 0.67 | 0.66 | 0.63 | 1.34 | 0.36 | 0.68 | 0.67 | 0.63 | 1.35 |

TABLE 10

| Classification | 8.08 ppm | 4.42 ppm | 4.36 ppm | 4.13 ppm | 4.07 ppm | 2.31 ppm | 1.96 ppm | 1.83 ppm | 1.78 ppm | 1.67 ppm | 1.64 ppm |
|---|---|---|---|---|---|---|---|---|---|---|---|
| Example 8 | 1 | 0.47 | 0.51 | 0.51 | 0.54 | 1.04 | 0.46 | 0.51 | 0.55 | 0.54 | 1.06 |
| Example 9 | 1 | 0.48 | 0.53 | 0.52 | 0.56 | 1.07 | 0.48 | 0.53 | 0.55 | 0.57 | 1.05 |
| Example 10 | 1 | 0.47 | 0.51 | 0.51 | 0.55 | 1.06 | 0.47 | 0.51 | 0.50 | 0.54 | 1.11 |
| Example 11 | 1 | 0.45 | 0.51 | 0.51 | 0.54 | 1.11 | 0.46 | 0.52 | 0.49 | 0.54 | 1.08 |
| Example 12 | 1 | 0.48 | 0.52 | 0.52 | 0.57 | 1.10 | 0.47 | 0.54 | 0.56 | 0.57 | 1.07 |
| Example 13 | 1 | 0.47 | 0.50 | 0.52 | 0.55 | 1.06 | 0.47 | 0.52 | 0.50 | 0.54 | 1.10 |
| Example 14 | 1 | 0.46 | 0.53 | 0.52 | 0.56 | 1.08 | 0.46 | 0.53 | 0.55 | 0.56 | 1.09 |

As shown in Table 11 below, an alternating degree and a biodegradability after 9 weeks per mol % of adipic acid were derived.

TABLE 11

| Classification | Alternating degree | Biodegradability after 9 weeks per mol % of adipic acid |
|---|---|---|
| Example 1 | 0.5 | 1.72 |
| Example 2 | 0.502 | 1.75 |
| Example 3 | 0.507 | 1.70 |
| Example 4 | 0.497 | 1.82 |
| Example 5 | 0.5 | 1.65 |
| Example 6 | 0.5 | 1.77 |
| Example 7 | 0.507 | 1.69 |
| Comparative Example 1 | 0.357 | 2.13 |
| Comparative Example 2 | 0.601 | 1.53 |

As shown in Table 12 below, an alternating ratio and a biodegradability after 9 weeks per mol % of adipic acid were derived.

TABLE 12

| Classification | Hard segment ratio | Tensile strength (MPa) | Elongation at break (%) |
|---|---|---|---|
| Example 1 | 0.232 | 50.9 | 1021 |
| Example 2 | 0.230 | 42.4 | 852 |
| Example 3 | 0.230 | 44.3 | 867 |
| Example 4 | 0.224 | 46.7 | 939 |
| Example 5 | 0.230 | 42.9 | 897 |
| Example 6 | 0.230 | 49.5 | 879 |
| Example 7 | 0.222 | 43.8 | 1036 |
| Comparative Example 1 | 0.426 | 45.3 | 920 |
| Comparative Example 2 | 0.113 | 37.5 | 1130 |

As shown in Tables 3 to 12, the biodegradable polyester resin compositions according to the examples may have an adequate initial hydrolysis degree and a high later hydrolysis degree. That is, the biodegradable polyester resin compositions according to the examples may have a high final hydrolysis degree while having a low initial hydrolysis degree.

In addition, the biodegradable polyester resin compositions according to the examples may have a high biodegradability degree while having an appropriate aliphatic carboxylic acid content and an appropriate aromatic carboxylic acid content. Accordingly, the biodegradable polyester resin composition according to an embodiment may have a high biodegradability degree while having a high initial hydrolysis degree.

In addition, the biodegradable polyester resin compositions according to the examples may have appropriate tensile strength and appropriate elongation at break while having a high biodegradability degree.

A biodegradable polyester resin composition according to an embodiment includes a polyester resin having an appropriate alternating degree. The content of a diol bonded between the aromatic dicarboxylic acid and the aliphatic dicarboxylic acid can be appropriate.

Accordingly, the biodegradable polyester resin can have a structure wherein the aromatic dicarboxylic acid and the aliphatic dicarboxylic acid are appropriately alternately disposed. Accordingly, the biodegradable polyester resin can have improved crystal properties, and the biodegradable polyester resin composition according to an embodiment can have improved thermal and mechanical properties.

In addition, since the biodegradable polyester resin has a structure wherein the aromatic dicarboxylic acid and the aliphatic dicarboxylic acid are appropriately alternately disposed, the aromatic and aliphatic dicarboxylic acids in the molecule of the biodegradable polyester resin can be appropriately crossed. Accordingly, the biodegradable polyester resin composition according to an embodiment can have both appropriate hydrolysis and improved biodegradability.

In addition, since the biodegradable polyester resin has the above-described molecular structure, the biodegradable polyester resin composition according to an embodiment can have a high biodegradability per an aliphatic dicarboxylic acid content.

The biodegradable polyester resin composition according to an embodiment includes a polyester resin having an appropriate hard segment ratio. The content of a diol bonded between the aromatic dicarboxylic acid and the aromatic dicarboxylic acid can be appropriate.

Accordingly, the biodegradable polyester resin may appropriately include the bonded structure wherein the aromatic dicarboxylic acid and the aromatic dicarboxylic acid are bonded to the diol. Accordingly, the biodegradable polyester resin can have improved crystal properties, and the biodegradable polyester resin composition according to an embodiment can have improved thermal and mechanical properties.

In particular, since the biodegradable polyester resin has a hard segment ratio within the range, the biodegradable polyester resin composition according to an embodiment can have appropriately high tensile strength and appropriately high elongation at break.

In addition, since the biodegradable polyester resin has the above-described molecular structure, it can have appropriate moisture resistance and solvent resistance. Accordingly, the biodegradable polyester resin composition according to an embodiment can have improved printability.

Therefore, the biodegradable polyester resin composition according to an embodiment can be easily biodegraded after use while having improved physical properties during actual use.

The biodegradable polyester resin composition according to an embodiment can be efficiently applied to a film for packaging and the like. That is, a film made of the biodegradable polyester resin composition according to an embodiment can be used for general purposes such as packaging. Here, the biodegradable polyester resin composition according to an embodiment can initially have a low hydrolysis degree, and the biodegradable polyester film can maintain mechanical and chemical properties to a certain extent or more within a period of normal use by a user. At the same time, since the biodegradable polyester resin composition according to one embodiment has a high biodegradability degree, a film made of the biodegradable polyester resin composition according to an embodiment can be readily biodegraded when discarded after use. Although the disclosed embodiments of the present disclosure have been disclosed for illustrative purposes, those skilled in the art will appreciate that various modifications, additions and substitutions are possible, without departing from the scope the disclosure as disclosed.

DESCRIPTION OF SYMBOLS slurry stirrer 100
esterification part 200
polycondensation reaction part 300
post-treatment part 400
first recovery part 510
second recovery part 520

What is claimed is:

1. A biodegradable polyester resin composition, comprising: a polyester resin comprising a diol, an aromatic dicarboxylic acid and an aliphatic dicarboxylic acid,
   wherein an alternating ratio of the polyester resin ranges from 0.37 to 0.59,
   wherein the alternating ratio is a first ratio of a first diol quantity, bonded between the aromatic dicarboxylic acid and the aliphatic dicarboxylic acid, to a total quantity of the diol in the polyester resin,
   wherein the diol comprises 1,4-butanediol, the aromatic dicarboxylic acid comprises terephthalic acid or dimethyl terephthalate, and the aliphatic dicarboxylic acid comprises adipic acid,
   wherein the number average molecular weight of the polyester resin is about 40000 g/mol to about 90000 g/mol,
   wherein a tensile strength measured by the measurement method below ranges from 40 MPa to 60 MPa:
   wherein, in the measurement method, the biodegradable polyester resin composition is dried at 80° C., placed in a stainless steel mold, and compressed at 210° C. under a pressure of 10 MPa for 3 minutes to produce a polyester sheet having a thickness of 300 μm, and a tensile strength of the polyester sheet is measured,
   wherein an elongation at break of the polyester sheet ranges from 800% to 1100%,
   wherein a Young's modulus of the polyester sheet ranges from 20 MPa to 80 MPa,
   wherein the biodegradable polyester resin composition comprises an oligomer in a content ranging from about 3000 ppm to about 30000 ppm based on the total amount of the biodegradable polyester resin composition,
   wherein the molecular weight of the oligomer ranges from about 400 to about 1300, and
   wherein the oligomer comprises a reaction product of 1,4-butanediol, terephthalic acid and adipic acid.

2. The biodegradable polyester resin composition according to claim 1, wherein the alternating ratio ranges from 0.4 to 0.56.

3. The biodegradable polyester resin composition according to claim 1, wherein the alternating ratio ranges from 0.45 to 0.53.

4. The biodegradable polyester resin composition according to claim 1, wherein a hard segment ratio of the biodegradable polyester resin composition ranges from about 0.2 to about 0.3,
   wherein the hard segment ratio is a second ratio of a second diol quantity, bonded between the aromatic dicarboxylic acid, to the total quantity of the diol in the polyester resin.

5. The biodegradable polyester resin composition according to claim 4, wherein a soft segment ratio of the biodegradable polyester resin composition is about 0.21 to about 0.31,
   wherein the soft segment ratio is a third ratio of a third diol quantity, bonded between the aliphatic dicarboxylic acid, to the total quantity of the diol in the polyester resin.

6. The biodegradable polyester resin composition according to claim 5, wherein the soft segment ratio is larger than the hard segment ratio.

7. The biodegradable polyester resin composition according to claim 1, wherein a biodegradability after nine weeks of the biodegradable polyester resin composition is 85% or more,
   wherein the biodegradability after nine weeks is measured by the measurement method below:
   in the measurement method, the biodegradability after nine weeks is a molecular weight reduction rate compared to an initial molecular weight of the biodegradable polyester resin composition when the biodegradable polyester resin composition is placed at a temperature of 60° C. and a humidity of 90% for 9 weeks under a composting condition.

8. A biodegradable polyester resin composition, comprising: a polyester resin comprising a diol, an aromatic dicarboxylic acid and an aliphatic dicarboxylic acid,
wherein a hard segment ratio of the polyester resin ranges from 0.2 to 0.3,
wherein the hard segment ratio is a ratio of a diol quantity, bonded between the aromatic dicarboxylic acid and the aromatic dicarboxylic acid, to a total quantity of the diols diol in the polyester resin,
wherein the diol comprises 1,4-butanediol, the aromatic dicarboxylic acid comprises terephthalic acid or dimethyl terephthalate, and the aliphatic dicarboxylic acid comprises adipic acid, wherein the number average molecular weight of the polyester resin is about 40000 g/mol to about 90000 g/mol,
wherein a tensile strength measured by the measurement method below ranges from 40 MPa to 60 MPa:
wherein, in the measurement method, the biodegradable polyester resin composition is dried at 80° C., placed in a stainless steel mold, and compressed at 210° C. under a pressure of 10 MPa for 3 minutes to produce a polyester sheet having a thickness of 300 μm, and a tensile strength of the polyester sheet is measured,
wherein an elongation at break of the polyester sheet ranges from 800% to 1100%,
wherein a Young's modulus of the polyester sheet ranges from 20 MPa to 80 MPa,
wherein the biodegradable polyester resin composition comprises an oligomer in a content ranging from about 3000 ppm to about 30000 ppm based on the total amount of the biodegradable polyester resin composition,
wherein the molecular weight of the oligomer ranges from about 400 to about 1300, and
wherein the oligomer comprises a reaction product of 1,4-butanediol, terephthalic acid and adipic acid.

9. The biodegradable polyester resin composition according to claim 8, wherein the hard segment ratio ranges from 0.21 to 0.28.

10. The biodegradable polyester resin composition according to claim 8, wherein the hard segment ratio ranges from 0.22 to 0.27.

11. A biodegradable molded article, comprising the biodegradable polyester resin composition of claim 1.

12. A biodegradable molded article, comprising the biodegradable polyester resin composition of claim 8.

* * * * *